(12) United States Patent
Jiang et al.

(10) Patent No.: US 12,400,417 B2
(45) Date of Patent: Aug. 26, 2025

(54) MULTI-MODAL SENSOR CALIBRATION FOR IN-CABIN MONITORING SYSTEMS AND APPLICATIONS

(71) Applicant: NVIDIA Corporation, Santa Clara, CA (US)

(72) Inventors: Hairong Jiang, Campbell, CA (US); Yuzhuo Ren, Sunnyvale, CA (US); Nitin Bharadwaj, Cupertino, CA (US); Chun-Wei Chen, San Jose, CA (US); Varsha Chandrashekhar Hedau, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 429 days.

(21) Appl. No.: 17/935,473

(22) Filed: Sep. 26, 2022

(65) Prior Publication Data

US 2024/0104879 A1    Mar. 28, 2024

(51) Int. Cl.
*G06V 10/24* (2022.01)
*B60W 40/02* (2006.01)
(Continued)

(52) U.S. Cl.
CPC .......... *G06V 10/245* (2022.01); *B60W 40/02* (2013.01); *G06T 3/60* (2013.01); *G06T 7/20* (2013.01);
(Continued)

(58) Field of Classification Search
CPC .. G06V 10/245; G06V 2201/07; G06V 20/56; G06V 20/59; B60W 40/02;
(Continued)

(56) References Cited

U.S. PATENT DOCUMENTS 10,885,698 B2    1/2021    Muthler et al.
11,144,754 B2    10/2021   Hu et al.
(Continued)

OTHER PUBLICATIONS

Non-Final Office Action received for U.S. Appl. No. 17/935,465, mailed on Aug. 7, 2024, 12 pages.
(Continued)

*Primary Examiner* — Nay A Maung
*Assistant Examiner* — Vaisali Rao Koppolu
(74) *Attorney, Agent, or Firm* — Shook, Hardy & Bacon L.L.P.

(57) ABSTRACT

In various examples, calibration techniques for interior depth sensors and image sensors for in-cabin monitoring systems and applications are provided. An intermediary coordinate system may be generated using calibration targets distributed within an interior space to reference 3D positions of features detected by both depth-perception and optical image sensors. Rotation-translation transforms may be determined to compute a first transform (H1) between the depth-perception sensor's 3D coordinate system and the 3D intermediary coordinate system, and a second transform (H2) between the optical image sensor's 2D coordinate system and the intermediary coordinate system. A third transform (H3) between the depth-perception sensor's 3D coordinate system and the optical image sensor's 2D coordinate system can be computed as a function of H1 and H2. The calibration targets may comprise a structural substrate that includes one or more fiducial point markers and one or more motion targets.

22 Claims, 16 Drawing Sheets

(51) Int. Cl.
  *G06T 3/60* (2006.01)
  *G06T 7/20* (2017.01)
  *H04N 13/246* (2018.01)
  *B60W 50/00* (2006.01)

(52) U.S. Cl.
  CPC ... *H04N 13/246* (2018.05); *B60W 2050/0004* (2013.01); *B60W 2420/403* (2013.01); *G06T 2207/20084* (2013.01); *G06V 2201/07* (2022.01)

(58) Field of Classification Search
  CPC ... B60W 2050/0004; B60W 2420/403; B60W 40/08; G06T 3/60; G06T 7/20; G06T 2207/20084; G06T 2207/20081; G06T 2207/30204; G06T 7/80; H04N 13/246
  See application file for complete search history.

(56) References Cited

U.S. PATENT DOCUMENTS

| | | | |
|---|---|---|---|
| 2021/0056306 A1* | 2/2021 | Hu | G06V 40/193 |
| 2021/0082148 A1* | 3/2021 | Parkison | G01S 7/40 |
| 2021/0190922 A1* | 6/2021 | Yu | G01S 17/86 |
| 2023/0025152 A1 | 1/2023 | Shrivastava et al. | |
| 2023/0264702 A1* | 8/2023 | Chang | G01S 13/42 |
| | | | 702/150 |
| 2023/0399015 A1* | 12/2023 | Kothari | G06V 10/14 |
| 2024/0161527 A1* | 5/2024 | Jotwani | G06T 7/73 |

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).

ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-Sep. 2016, pp. 1-30 (Sep. 30, 2016).

Domhof, J., et al., "An Extrinsic Calibration Tool for Radar, Camera and Lidar", International Conference on Robotics and Automation (ICRA), pp. 7 (2019).

IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.

Final Office Action received for U.S. Appl. No. 17/935,465, mailed on Jan. 24, 2025, 14 pages.

* cited by examiner

900

B902
DETERMINE, BASED AT LEAST ON IMAGE DATA GENERATED USING AN IMAGE SENSOR AND CORRESPONDING TO ONE OR MORE CALIBRATION TARGETS POSITIONED WITHIN AN INTERIOR SPACE OF A MACHINE, A FIRST TRANSFORM BETWEEN A THREE-DIMENSIONAL (3D) INTERMEDIARY COORDINATE SYSTEM AND A TWO-DIMENSIONAL (2D) IMAGE COORDINATE SYSTEM CORRESPONDING TO THE IMAGE SENSOR

B904
DETERMINE, BASED AT LEAST ON SENSOR DATA GENERATED USING THE DEPTH SENSOR AND CORRESPONDING TO AT LEAST ONE CALIBRATION TARGET OF THE ONE OR MORE CALIBRATION TARGETS, A SECOND TRANSFORM BETWEEN THE 3D INTERMEDIARY COORDINATE SYSTEM AND A 3D COORDINATE SYSTEM CORRESPONDING TO THE DEPTH SENSOR

B906
CONFIGURE ONE OR MORE OPERATIONS OF THE MACHINE BASED AT LEAST ON THE FIRST TRANSFORM AND THE SECOND TRANSFORM

FIGURE 9

MULTI-MODAL SENSOR CALIBRATION FOR IN-CABIN MONITORING SYSTEMS AND APPLICATIONS

CROSS-REFERENCE TO RELATED APPLICATIONS

This patent application is related to U.S. patent application Ser. No. 17/935,465, titled "SENSOR CALIBRATION USING FIDUCIAL MARKERS FOR IN-CABIN MONITORING SYSTEMS AND APPLICATIONS" filed on Sep. 26, 2022.

BACKGROUND

In-cabin monitoring systems may be used for a variety of purposes, such as for identifying a gaze direction or location of an occupant, monitoring an attentiveness of an occupant, determining safety-related events within a cabin of a vehicle, and/or for other purposes. Optical sensors may be used in these systems to generate sensor data that may be used to monitor occupants within an interior of the vehicle. For example, the sensor data may be processed to extract image features to identify motion and to attempt to classify the source of that motion. However, because optical sensors correspond to line-of-sight sensing, intervening objects may obstruct an optical sensor's field of view. Moreover, images taken with monocular camera systems may not provide direct or precise depth information. In contrast, the signals of a RADAR sensor are not line-of-sight, and can penetrate through intervening objects (e.g., a blanket, a child car-seat) to detect the presence of an occupant (e.g., person, animal, etc.) by measuring parameters such as distance, movement, speed of movement, direction of movement, and/or angular offsets, for example. However, depth-perception sensors may face challenges for in-cabin use, for example, with respect to ensuring that the sensor data received is based on activity within the vehicle as opposed to activity within a close proximity of the vehicle exterior. While optical sensor data and depth-perception data captured from within a vehicle may be used in conjunction as overlapping vehicle interior monitoring technologies, a challenge is presented in correlating optical sensor data and depth-perception sensor data into a coherent holistic set of sensor data that can be used together for vehicle in-cabin monitoring applications.

SUMMARY

Embodiments of the present disclosure relate to parameter calibration of depth sensors and optical sensors for in-cabin monitoring systems and applications. Systems and methods are disclosed that provide for calibrating one or more interior monitoring depth sensors to one or more interior monitoring image sensors such that subjects observed within a shared field of view of these sensors may be analyzed with respect to a shared coordinate space. There is presently a deficiency in the availability of techniques in the art for calibrating depth sensors and optical sensors with respect to their extrinsic parameters so that a feature detected using a depth sensor can be correlated to a feature detected using an optical sensor, or vice versa. For example, existing techniques using RADAR systems concentrate on the use of exterior RADAR sensors that face away from the vehicle interior rather than inwards towards areas of the vehicle interior.

In contrast to existing vehicle in-cabin monitoring technologies, the systems and methods presented in this disclosure build a framework to establish a shared three-dimensional (3D) intermediary coordinate system within a vehicle interior that may be used to reference the 3D position of features detected by both depth sensors (e.g., RADAR sensors, LiDAR sensors) and optical sensors (e.g., image sensors). As a result, a coherent set of sensor data is generated from two or more of these sensors that may be cross-referenced between depth sensor data and optical sensor data. The shared 3D intermediary coordinate system may be generated by reconstructing a 3D volume representative of the vehicle or other machine interior, based on establishing the relative position of a plurality of hybrid calibration targets that are distributed across a field of view within a vehicle interior space. The plurality of hybrid calibration targets together may form a system of hybrid calibration targets that define a reference frame within the vehicle interior space for the 3D intermediary coordinate system. Both depth sensor data and optical sensor data may be translated to the 3D intermediary coordinate system to form a coherent holistic set of sensor data for detecting and/or classifying motion or other information corresponding to the vehicle interior space.

In some embodiments, extrinsic calibration parameters representing, e.g., translation and rotation of a depth sensor may be determined in order to compute a first transform (H1) between the depth sensor's 3D coordinate system and the 3D intermediary coordinate system. Likewise, extrinsic calibration parameters representing, e.g., translation and rotation of an optical sensor may be determined to compute a second transform (H2) between the optical sensor's two-dimensional (2D) coordinate system and the 3D intermediary coordinate system. The relationship to map the depth sensor's 3D coordinate system and the optical sensor's 2D coordinate system can be represented as a function of the H1 and H2 transforms. For example, captured depth sensor data may be translated to a position in an image frame in the optical sensor's 2D coordinate system by a third rotation-translation transform (H3) represented, as an example, by the expression $H3=f(H2, H1)$, or $H3=H2 \times H1$.

The hybrid calibration targets used to generate the 3D intermediate coordinate system and the rotation-translation transforms may include a structural substrate that includes one or more fiducial point markers and one or more motion targets. The one or more fiducial point markers may include an array of visual fiducial system patterns, such as, but not limited to, AprilTag patterns or other patterns that facilitate computing precise 3D position, orientation, and/or identify of the fiducial point markers. The one or more motion targets may each comprise an observable moving component positioned on the substrate adjacent to the one or more fiducial point markers. The structural substrate may be comprised of a material that dampens vibrations produced by the motion targets. By damping vibrations, the motion of the rotating motion targets may be readily differentiated by the depth sensor from the relatively motion-free structural substrate and fiducial point markers. As explained herein, the fiducial point markers may function as targets for detection using an optical sensor while the motion targets function as targets for the depth sensor.

BRIEF DESCRIPTION OF THE DRAWINGS

The present systems and methods for calibration of depth sensors and image sensors for in-cabin monitoring systems and applications are described in detail below with reference to the attached drawing figures, wherein:

FIG. 9 is a flow diagram showing a method for depth sensor to image or optical sensor extrinsic parameter calibration, in accordance with some embodiments of the present disclosure;

DETAILED DESCRIPTION

Figure 1:
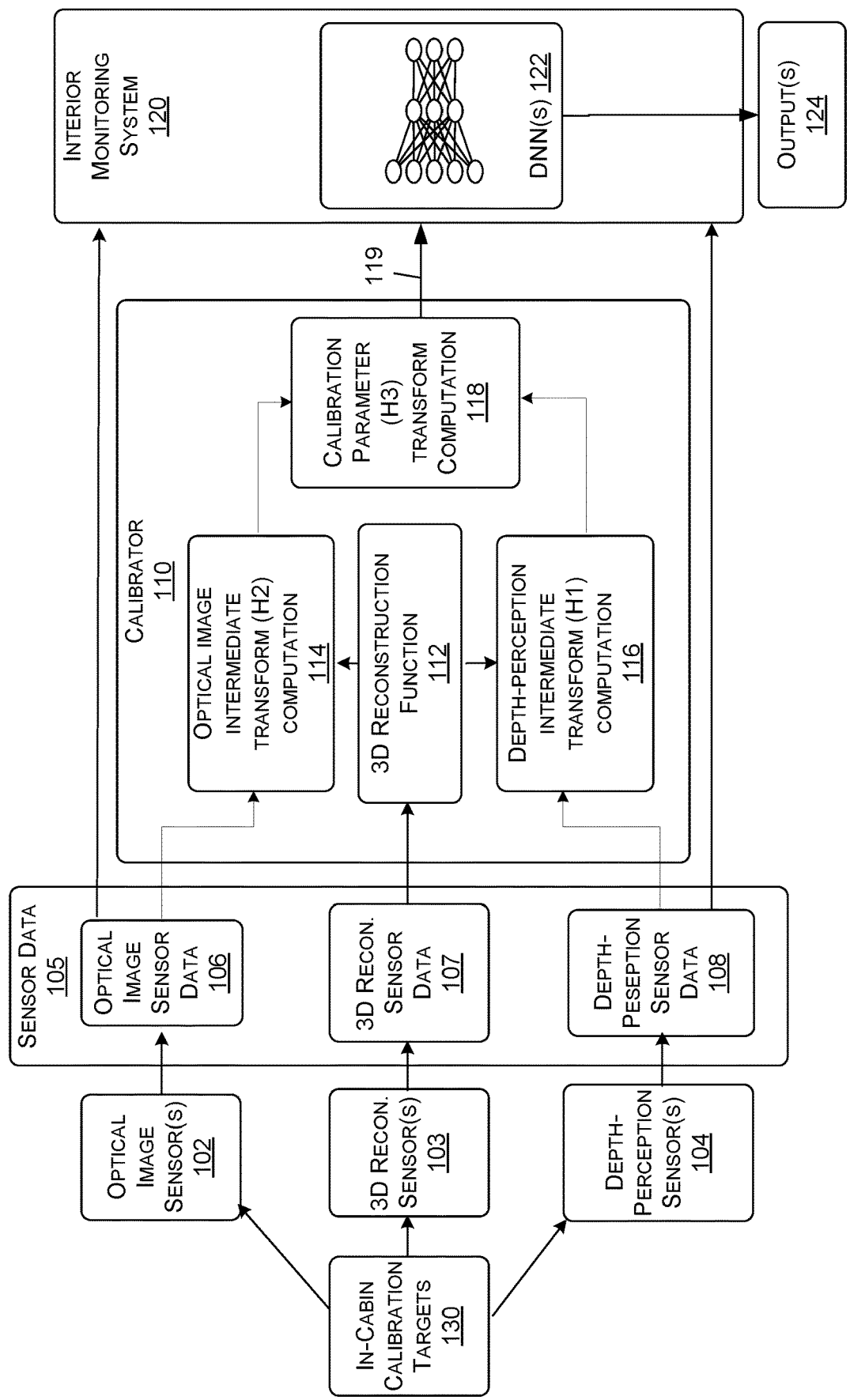
FIG. 1 is an illustration of an example flow diagram for a sensor extrinsic parameter calibration operating environment, in accordance with some embodiments of the present disclosure.

Systems and methods are disclosed related to calibration of depth and optical image sensors for in-cabin monitoring systems and applications. Although the present disclosure may be described with respect to an example autonomous or semi-autonomous vehicle 1000 (alternatively referred to herein as "vehicle 1000" or "ego-machine 1000," an example of which is described with respect to FIGS. 10A-10D), this is not intended to be limiting. For example, the systems and methods described herein may be used by, without limitation, non-autonomous vehicles or machines, semi-autonomous vehicles or machines (e.g., in one or more advanced driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. In addition, although the present disclosure may be described with respect to vehicle interior monitoring, this is not intended to be limiting, and the systems and methods described herein may be used in augmented reality, virtual reality, mixed reality, robotics, security and surveillance, autonomous or semi-autonomous machine applications, and/or any other technology spaces where calibration between sensors of different modalities may be used.

The present disclosure relates to vehicle interior (in-cabin) monitoring technologies. More specifically, the systems and methods presented in this disclosure provide for calibrating one or more interior monitoring system depth sensors (such as in-cabin RADAR, LIDAR, and/or ultrasonic sensors, for example) to one or more image sensors (such as a sensor of a camera, an RGB sensor, an Infrared sensor (IR), and/or a depth sensor or other optical sensor, for example) so that subjects observed within a shared field of view two or more sensors may be analyzed with respect to a shared three-dimensional (3D) coordinate space.

Optical image sensors of an interior monitoring system may capture a scene within a vehicle interior as a two-dimensional (2D) image frame. Parameters that influence how the 3D volume of the vehicle interior appears when projected onto the 2D coordinate space of the two-dimensional image frame include both extrinsic and intrinsic parameters. Extrinsic parameters may refer to factors that describe the physical orientation of the optical image sensor, such as rotation and translation (also referred to as roll and tilt), and/or other parameters. Intrinsic parameters may refer to factors that describe optical image sensor device optics, such as optical center (also known as the principal point), focal length, skew coefficient, field of view, and/or other parameters. While the intrinsic parameters of an occupant monitoring system (OMS) sensor can be established during manufacture and are expected to remain stable, the extrinsic parameters of rotation and translation instead depend on how the OMS sensor is mounted and oriented within the space of the cabin. The optical image sensor's extrinsic and intrinsic parameters both play a part in how features of a scene within the 3D coordinate space of the vehicle cabin (e.g., the cabin coordinate system) are mapped to the sensor captured image frame. While a depth-perception sensor generates sensor data mapped to a 3D coordinate space, extrinsic parameters corresponding to the physical orientation of the depth-perception sensor (e.g., rotation and translation) again play a part in how features of the 3D scene of the vehicle cabin are mapped to the 3D coordinate space of the captured point cloud. The extrinsic parameters of both the depth sensors and optical image sensors are a function of how the respective sensors are mounted and oriented within the space of the vehicle cabin.

Government regulators have only recently started approving the use of RADAR-based vehicle cabin monitors for short-range interactive motion sensing. Accordingly, there is presently a deficiency in the availability of techniques in the art for calibrating depth-perception sensors and optical image sensors together with respect to their extrinsic parameters so that a feature detected by one sensor can be correlated to a feature detected by the other sensor. Current literature regarding vehicle RADAR systems is concentrated on the use of exterior RADAR sensors that face away from the vehicle rather than inwards towards areas of the vehicle interior. While applications for exterior RADAR sensors are designed to detect both static and moving objects around the proximity of a moving vehicle (e.g., subjects such a persons, animals, hazards, obstacles, and/or other vehicles), an objective for applications of interior RADAR sensors may be to detect living subjects while substantially disregarding at least a portion of the structural elements of the vehicle interior. Such would be the case for child and/or pet detection technologies (e.g., to prevent a child or pets from being left alone in the vehicle by accident). Techniques for calibrating exterior RADAR sensors that face away from the vehicles do not readily translate to interior RADAR applications that include correlating captured depth and optical image sensor data.

In contrast to existing sensor calibration and in-cabin monitoring technologies, the systems and methods presented in this disclosure build a framework to establish a shared 3D intermediary coordinate system within a vehicle or machine interior that may be used to reference the 3D position of features detected by both depth sensors and optical sensors (or generally, two sensors of different modalities). As a result, a coherent set of sensor data is generated from the combination of these sensors that may be cross-referenced between depth sensor data and image data.

In some embodiments, a shared 3D intermediary coordinate system is generated by reconstructing a 3D volume representative of the vehicle interior, based on establishing the relative position of one or more (e.g., hybrid) calibration targets that are distributed across a field of view or sensory field within a vehicle interior space. These hybrid calibration targets together form a system of hybrid calibration targets that define a reference framework within the interior space for the 3D intermediary coordinate system. The 3D intermediary coordinate system may be referred to as a "hybrid" interior 3D coordinate system in instances where both depth sensor data and image data may be translated to the intermediary coordinate system to form a coherent holistic set of sensor data for detecting and/or classifying motion occurring within the vehicle or machine interior space.

In some embodiments, for example, extrinsic calibration parameters representing translation and rotation of a depth-perception sensor may be determined in order to compute a first transform (H1) between the depth-perception sensor's 3D coordinate system and the 3D intermediary coordinate system. Likewise, the extrinsic calibration parameters representing translation and rotation of an optical image sensor may be determined to compute a second transform (H2) between the optical image sensor's 2D coordinate system and the 3D intermediary coordinate system. The relationship to map the depth-perception sensor's 3D coordinate system and the optical image sensor's 2D coordinate system can be represented as a function of the H1 and H2 transforms. For example, captured depth-perception sensor data may be translated to a position in an image frame in the optical image sensor's 2D coordinate system by a third transform (H3) by the expression $H3=f(H2, H1)$, or $H3=H2 \times H1$.

In some embodiments, the hybrid calibration targets may include a structural substrate (e.g., a generally planar board or sheet comprising a rigid material) that includes one or more fiducial point markers (alternatively referred to as "fiducial markers") (e.g., ARtags, AprilTags, QR codes, etc.) and one or more motion targets. The one or more fiducial markers may comprise an array of visual fiducial system patterns, such as, but not limited to, AprilTag patterns or other patterns that facilitate computing precise 3D position, orientation, and/or identify of the fiducial markers. The one or more motion targets may comprise an observable moving (e.g., rotating) component positioned adjacent to the one or more fiducial markers. As an example, a motion target may comprise an electric motor (e.g., which may be battery operated) integrated with the structural substrate, and include a RADAR signal reflecting target that rotates when the electric motor is energized. The structural substrate may be comprised of a material that dampens vibrations produced by the motion targets. In some embodiments, to dampen vibrations, the RADAR signal reflecting target extends through a hole in the structural substrate so that the motion target is not directly attached to the structural substrate. For example, motion targets may be mounted to the structural substrate via one or more vibration attenuating materials (e.g., via an elastomer coupling). By damping vibrations, the motion of the rotating motion targets may be readily differentiated by the depth sensor from the relatively motion-free structural substrate and fiducial markers. As explained herein, the fiducial markers may function as targets for detection using an optical image sensor(s) while the motion targets may function as targets for the depth sensor(s).

The relative positions of the one or more fiducial markers and the one or more motion targets may be fixed with respect to each other and the structural substrate and have known positions from which relative coordinates may be derived. In some embodiments, a local coordinate system for a hybrid calibration target may be defined based on the one or more fiducial markers serving as the local origin, and coordinates of the motion targets defined relative to the fiducial markers. For example, in some embodiments, a local origin of a hybrid calibration target may be defined as the center of a top left fiducial marker on the hybrid calibration target, and the coordinates of other fiducial markers and/or the motion targets on that hybrid calibration target determined as a function of distance from that local origin. As an example of a configuration, a hybrid calibration target may comprise a three-by-four array of fiducial markers positioned substantially at a center of the structural substrate, and four motion targets arranged at corners of a rectangle that envelopes the three-by-four array of fiducial markers. In other embodiments, other configurations may be used. Local coordinates for each of the fiducial markers and each of the motion targets may be established based on measurements of their respective offset from the fiducial marker at the origin of that hybrid calibration target. As further explained below, hybrid calibration targets function as a calibration aid that may be used to establish the 3D intermediary coordinate system.

To build the 3D intermediary coordinate system for a given vehicle or machine interior, a plurality of the hybrid calibration targets may be positioned across the volume of space for which vehicle interior monitoring is to be implemented. These hybrid calibration targets may be located such that they appear within an overlapping field of view of both the depth sensor(s) and the optical image sensor(s) that are being calibrated. The number of hybrid calibration targets in the system of hybrid calibration targets may vary as a function of the size of the interior space, but generally should be distributed to span the area to be monitored, have a diversity of alignments (e.g., arranged to align with at least two distinct intersecting planes within the interior space), and be sufficient in number to produce robust H1, H2, H3 transforms.

For a non-limiting example, for a typical vehicle cabin of a consumer automobile, the system of hybrid calibration targets may include five hybrid calibration targets with a hybrid calibration target positioned on the driver's seat cushion, a hybrid calibration target positioned on the driver's seat back cushion, a hybrid calibration target positioned on the front passenger's seat cushion, a hybrid calibration target positioned on the front passenger's seat back cushion, and a hybrid calibration target positioned on the center console between the driver's seat and the front passengers seat. The two hybrid calibration targets positioned on the seat cushions would thus be aligned to an approximately horizontal plane, and the hybrid calibration targets positioned on the seat back cushions and center console aligned to an approximately vertical plane. Moreover, this positioning would approximately fill the field of view from the perspective of overhead occupancy monitoring depth sensors and optical sensors (e.g., a sensor looking into the vehicle cabin from the rear-view mirror position). In some embodiments, depth sensors and optical sensors may be separated in distance as long as they have a shared field of view. In some embodiments, because the center console is a generally centralized location, the origin of the hybrid calibration target positioned on the center console may be selected to define the origin of the 3D intermediary coordinate system. This hybrid calibration target may be referred to as the reference calibration target.

With the system of hybrid calibration targets in place, the 3D intermediary coordinate system may be generated using 3D reconstruction algorithms that generate 3D models of a space from a set of images. For example, in some embodiments, 3D reconstruction algorithms may be applied that take as input a plurality of images (e.g., on the order of 20 images) capturing each of the hybrid calibration targets—with their more fiducial markers clearly visible. The camera(s) used to capture the images of hybrid calibration targets (at least for the purpose of 3D reconstruction) may be one or more cameras with known intrinsic parameters, and may include one or more of the image sensors of the interior monitoring system, or other image sensors.

Appling the plurality of images and camera intrinsic parameters as input, the 3D reconstruction algorithm may generate a rotation-translation transform (e.g., a transformation matrix) that maps between an individual hybrid calibration target's local reference system to an 3D intermediary coordinate system generated by the 3D reconstruction algorithm. In some embodiments, an origin of a designated hybrid calibration target is used by the 3D reconstruction algorithm to define an origin of the 3D intermediary coordinate system. 3D reconstruction thus links all of the hybrid calibration targets to a common origin and a coordinate definition. In some embodiments, a 3D reconstruction algorithm may include one or more computer vision algorithms such as an algorithm based on the OpenCV (open source computer vision library).

With respect to establishing calibration between the depth-perception sensor of the interior monitoring system and the 3D intermediary coordinate system, the extrinsic calibration parameters representing translation and rotation of a depth sensor may be determined to compute a first transform (H1). The transform H1 describes the rotation and translation between the depth sensor's 3D coordinate system and the 3D intermediary coordinate system. In some embodiments, the motion target(s) of the hybrid calibration targets is activated (e.g., set in motion). With the motion targets activated, depth sensor data from the motion targets is collected by the depth sensor. The depth sensor data may include 3D position data for the one or more motion targets detected within the field of view or sensory field of the depth sensor. As an non-limiting example, in some embodiments the depth sensor may comprise a Texas Instruments TI AWR6843AOP RADAR sensor. The relative position of the one or more motion targets on a hybrid calibration target to the local origin of the hybrid calibration target are known constants that may be derived based on the construction details of the hybrid calibration target. For example, in an implementation, a top left fiducial marker of the hybrid calibration target may define the local origin of that hybrid calibration target, and the coordinates of the motion targets defined with respect to that local origin. In some embodiments, the coordinates of the local origin with respect to the 3D intermediary coordinate system are established via the 3D reconstruction, so that a rotation-translation transform may be computed to transform the detected 3D coordinates of the detected motion targets in the depth sensor's 3D coordinate system to the 3D intermediary coordinate system.

In embodiments, a set of pairwise 3D data may be generated from the depth sensor data. For each of the detected motion targets, a 3D data pair may include: the motion target's 3D coordinates in the point cloud coordinate system of the depth-perception sensor; and the motion target's 3D coordinates in the 3D intermediary coordinate system. An optimization algorithm, such as a least-square method algorithm, may be applied to the set of pairwise 3D data to determine a minimal projection error to derive the transform H1. Using the set of pairwise 3D data, the transform H1 may be derived by computing and minimizing re-projection errors across the plurality of motion targets within the field of view of the depth sensor (e.g., using the least square method) and deriving the transformation H1 that maps between motion targets coordinates with respect to the depth sensor's 3D point cloud coordinate system and the 3D intermediary coordinate system. The computed H1 transform may be saved to memory as an extrinsic calibration parameter corresponding to the depth-perception sensor.

In some embodiments, to validate the accuracy of the H1 transformation, the predicted 3D coordinates computed for a motion target in the 3D intermediary coordinate system, the 3D coordinates in the point cloud coordinate system may be computed as a function of the estimated H1 transform and re-projected into the point cloud coordinate system as a validation point. Deviation between the coordinates of the validation point and the coordinates of the sensor captured point cloud may indicate robustness and/or a calibration error in H1 transform. In some embodiments, calibration errors computed for a plurality of re-projected validation points may similarly be determined and an aggregate calibration accuracy metric computed for H1 transform.

With respect to calibrating between the optical image sensor of the interior monitoring system and the 3D intermediary coordinate system, the extrinsic calibration parameters representing translation and rotation of an optical image sensor may be determined to compute a second transform (H2). The transform H2 describes the rotation and translation between the optical image sensor's 2D coordinate system and the 3D intermediary coordinate system.

In some embodiments, an image frame capturing a plurality of the fiducial markers from the plurality of hybrid calibration targets may be generated from sensor data (e.g., image data) captured by the optical image sensor. To detect the location of fiducial markers in the 2D coordinate space (e.g., u, v) of the captured image frame, processing of the image frame may be performed using one or more computer vision algorithms and/or machine learning models. 3D coordinates (e.g., x, y, z) corresponding with each of those fiducial markers may have been previously established during the 3D reconstruction process for building the 3D coordinate system (as further discussed below with respect to FIG. 3).

For each fiducial point, a pairing of corresponding 2D coordinates (u, v) and 3D coordinates (x, y, z) may be used to define a respective coordinate pair. The set of coordinate pairs that comprises the respective coordinate pair for each of the fiducial markers identified from the captured image frame may then be processed by a pose computation algorithm. In some embodiments, the pose computation algorithm computes the H2 transform as an optimized translation-rotation matrix corresponding to the extrinsic pose of the optical image sensor. The OpenCV algorithm solvePnP is one example of a pose computation algorithm that may be used to estimate rotation and translation vectors. These rotation and translation vectors represent a transform between a 3D point expressed in the 3D intermediary coordinate system frame and a 2D point expressed in the image coordinate frame. For example, in at least one embodiment, the relationship between an optical image sensor's 2D coordinate space (u, v) and the 3D intermediary coordinate system (x, y, z) may be expressed as:

$$s\begin{bmatrix} u \\ v \\ 1 \end{bmatrix} = \begin{bmatrix} f_x & \gamma & u_0 \\ 0 & f_y & v_0 \\ 0 & 0 & 1 \end{bmatrix}[R|T]\begin{bmatrix} x \\ y \\ z \\ 1 \end{bmatrix} = \begin{bmatrix} f_x & \gamma & u_0 \\ 0 & f_y & v_0 \\ 0 & 0 & 1 \end{bmatrix}\begin{bmatrix} r_{11} & r_{12} & r_{13} & t_1 \\ r_{21} & r_{22} & r_{23} & t_2 \\ r_{31} & r_{32} & r_{33} & t_3 \end{bmatrix}\begin{bmatrix} x \\ y \\ z \\ 1 \end{bmatrix}$$

where the sensor intrinsic parameters $f_x$ and $f_y$ correspond to focal length, $u_0$ and $v_0$ correspond to the optical image sensor principal point, and $\gamma$ corresponds to an optical distortion (e.g., skew) coefficient, and s is a scaling factor. Regarding the sensor extrinsic parameters, these are expressed by the RT matrix wherein the rotation vector (R) comprises the elements $r_{11}$, $r_{21}$, $r_{31}$, $r_{12}$, $r_{22}$, $r_{32}$, $r_{13}$, $r_{23}$, $r_{33}$ of the RT matrix, and translation vector (T) comprises the elements $t_1$, $t_2$, $t_3$ of the RT matrix. In some embodiments, the pose computation algorithm iteratively computes H2 transforms (e.g., the RT matrix) to converge on a set of R and T values that optimally fit the 2D and 3D coordinates of the set of coordinate pairs of the detected fiducial point markers. The resulting optimal H2 transform computed by the pose computation algorithm thus represents an estimate of the pose of the optical image sensor with respect to the 3D intermediary coordinate system. The computed H2 transform may be saved to memory as an extrinsic calibration parameter corresponding to that optical image sensor.

In some embodiments, the accuracy of the estimated H2 transform may be determined by re-projecting the known 3D coordinates of one or more fiducial markers back onto an image of the fiducial markers captured by an optical image sensor. For example, given the known 3D coordinates ($x_1$, $y_1$, $z_1$) of a fiducial point, 2D coordinates ($u_1$, $v_1$) for a validation point may be computed as a function of the H2 transform, and projected onto an image of the fiducial point captured by the optical image sensor. The 2D coordinates of the validation point may be compared to the 2D coordinates of the fiducial point as determined directly from the captured image. Deviation between the coordinates of the validation point and the coordinates of the fiducial point from the captured image may indicate robustness and/or a calibration error in the H2 transform. In some embodiments, calibration errors computed for a plurality of fiducial markers from the captured image frame may similarly be determined and an aggregate calibration accuracy metric computed for the H2 transform.

The relationship between the depth sensor's 3D coordinate system and the optical image sensor's 2D coordinate system can be represented as a function of the H1 and H2 transforms. For example, captured depth-perception sensor data may be translated to a position in an image frame in the optical image sensor's 2D coordinate system by a third transform (H3) by the expression H3=H2×H1. Depth sensor measurements of a detected feature may thus be correlated with optical image sensor data for the detected features via the H3 transform. The computed H3 transform may be saved to memory as an extrinsic calibration parameter to correlate sensor data from the depth sensor with sensor data from the optical image sensor.

Moreover, in some embodiments, extrinsic parameter transform between different optical image sensors may be used to effectively create an extended optical image field of view which may be calibrated to a depth sensor. For example, in some embodiments, a first optical image sensor may be calibrated to the 3D intermediary coordinate system with respect to rotation-translation as represented by the H2 transform, and a second optical image sensor also calibrated to the 3D intermediary coordinate system as represented by rotation-translation transform H2'. Captured sensor data from the second optical image sensor may be translated to a position in the image frame coordinated of the first optical image sensor via a transform H4 where H4=H2×H2'. Since the coordinates of the first optical image sensor are relatable to the depth sensor via transform H3, then the coordinates of the second optical image sensor may also be related to the depth sensor via another transform (H5) computed as a function of H3 and H4. In this way, even if the depth sensor and the second optical image sensor do not directly share an overlapping field of view or sensory field, their rotation and translation parameter relationship may still be computed with respect to the 3D intermediary coordinate system by chain-linking extrinsic parameters. For example, in some implementations, a first optical image sensor viewing a first row of a vehicle cabin, and a second optical image sensor viewing a second row of a vehicle cabin, may both be calibrated to a depth sensor (such as a RADAR sensor that can take measurements that penetrate through objects such as seats) to produce a coherent holistic set of sensor data for the vehicle or machine cabin. A vehicle or machine interior space may include other areas of a vehicle besides a passenger cabin. For example, in some embodiments, a vehicle interior space may comprise a trunk, cargo bed, and/or other interior vehicle or machine space.

While the interior monitoring system embodiments presented in this disclosure may be implemented in the context of vehicle occupant monitoring (including driver and/or passenger monitoring) for vehicles such as, but not limited to, non-autonomous vehicles, semi-autonomous vehicles, piloted and un-piloted robots or robotic platforms, warehouse vehicles, off-road vehicles, vehicles coupled to one or more trailers, aircraft, spacecraft, boats, shuttles, emergency response vehicles, construction vehicles, underwater craft, drones, and/or other vehicle types, other embodiments may be implemented within the context of other interior spaces, such as rooms, warehouses, gymnasiums, containers, and/or studios.

The various image processing, feature detection, calibration parameter computations and other algorithms disclosed herein, may be executed at least in part on one or more graphics processing units that may operate in conjunction with software executed on a central processing unit coupled to a memory. The graphics processing units may be programmed to execute kernels to implement one or more functions for detecting fiducial point markers from captured images of the motion prediction models, and in some embodiments, computing 2D coordinates of the fiducial point markers. In some embodiments, the execution of some algorithms may be distributed and performed by a combination of processors and cloud computing resources.

With reference to FIG. 1, FIG. 1 is a data flow diagram illustrating an example process 100 for depth-perception sensor to image sensor extrinsic parameter calibration for in-vehicle monitoring systems and applications, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 1000 of FIGS. 10A-10D, example computing device 1100 of FIG. 11, and/or example data center 1200 of FIG. 12.

The process 100 may include generating and/or receiving sensor data 105 from sensors that may include one or more sensors of a vehicle or machine 1000 (which may be similar to the vehicle or machine 1000, or may include non-autonomous or semi-autonomous vehicles), and/or other sensors. The sensor data 105 may include optical image sensor data 106 (captured by one or more optical image sensors 102) and depth-perception sensor data 108 (captured by one or more depth-perception sensors 104) that is used by an interior ("in-cabin") monitoring system 120 for various interior monitoring functions such as, but not limited to, vehicle burglary protection, child and/or animal occupant detection (e.g., to prevent children or pets from accidentally being left alone in the vehicle), object detection (e.g., to detect the presence of packages, child or pet carriers, or other objects), activity monitoring, attentiveness monitoring, gaze prediction, digital assistant interaction monitoring (e.g., to monitor what a user is doing, where the user is looking, etc., for the purposes of generating context or contextual data to aid the assistant—which may be coupled with a digital avatar—in responding or communicating with the user), and/or other functions. Other interior monitoring functions may include, for example, identifying faces, facial landmarks, eye information, and/or other information of one or more occupants of the vehicle 1000, identifying an occupant(s) based on facial features, and/or detecting gaze of an occupant(s) of the vehicle 1000. Based at least in part on the sensor data 105 (e.g., at least optical image sensor data 106 and depth-perception sensor data 108), the interior monitoring system 120 may generate output(s) 124. In addition to optical image sensor data 106 and depth-perception sensor data 108, the sensor data 105 may also include 3D reconstruction sensor data 107, which may be used to generate the 3D volume representative of the vehicle interior and 3D intermediary coordinate system, as is further discussed herein.

Output(s) 124 may be generated using one or more machine learning models and/or deep neural networks (DNNs) 122. As an example, the interior monitoring system 120 may use optical image sensor data 106 and/or depth-perception sensor data 108 to predict the presence and/or location of occupants—such as objects, persons, and/or animals—within the interior space of the vehicle 1000, wherein other systems of the vehicle 1000 may determine one or more actions to take based on the predictions, and/or other tasks or operations. For example, based on output(s) 124, an alarm or warning may be generated, door locks and/or windows may be operated, various functions may be turned on/off, data for a digital assistant, chat bot, digital avatar, and/or the like may be generated, and/or air conditioning or air circulation functions may be operated. As discussed herein, in order to produce output(s) 124, the interior monitoring system 120 is calibrated to account for the intrinsic and extrinsic calibration parameters of the optical image sensor(s) 102 and depth-perception sensor(s) 104 so that features captured by one sensor type may be correlated with features captured by the sensor type to form a coherent holistic set of sensor data, for example, for detecting and/or classifying motion occurring within the vehicle interior space.

Although examples are described herein with respect to an interior monitoring system 120 using the DNN(s) 122 to process sensor data 105, this is not intended to be limiting. For example, and without limitation, the interior monitoring system 120 may include DNN(s) 122 and/or other computer vision algorithms, image processing algorithms, machine learning models (e.g., machine learning algorithms), etc. in order to detect and/or classify features from the optical image sensor data 106 and/or depth-perception sensor data 108. The output(s) 124 of the interior monitoring system 120 and/or DNN(s) 122 may undergo post-processing, in embodiments, such as by converting raw outputs to useful outputs—e.g., where a raw output corresponds to a confidences for individual points or pixels that the point or pixel corresponds to a gaze location of a user, post-processing (e.g., filtering, clustering, etc.) may be executed to determine a final point(s) that corresponds to the gaze location of the user. This post-processing may include temporal filtering, weighting, outlier removal (e.g., removing pixels or points determined to be outliers), upscaling (e.g., the outputs may be predicted at a lower resolution than an input sensor data instance, and the output may be upscaled back to the input resolution), downscaling, curve fitting, and/or other post-processing techniques. The output(s) 124—after post-processing, in embodiments—may be in either a 2D coordinate space (e.g., image space, etc.) and/or may be in a 3D coordinate system (e.g., a 3D coordinate system of the vehicle).

The sensor data 105 may include, without limitation, sensor data from any type of optical sensors (e.g., RGB sensors, Infrared sensors (IR), depth sensors, cameras, or other optical sensors, for example) and/or depth-perception sensors, such as but not limited to those described herein with respect to the vehicle 1000 and/or other vehicles or objects—such as robotic devices, VR systems, AR systems, mixed reality systems, etc., in some examples. As a non-limiting example, and with reference to FIGS. 10A-10C, the sensor data 105 may include the data generated by, without limitation, RADAR sensor(s) 1060, ultrasonic sensor(s) 1062, LIDAR sensor(s) 1064, stereo camera(s) 1068, wide-view camera(s) 1070 (e.g., fisheye cameras), infrared camera(s) 1072, surround camera(s) 1074 (e.g., 360 degree cameras), long-range and/or mid-range camera(s) 1098, in-cabin cameras, in-cabin heat, pressure, or touch sensors, in-cabin motion sensors, and/or other sensor types.

In some embodiments, the sensor data 105 may correspond to sensor data comprising 2D image frames or 3D representations (e.g., point clouds, projection images, depth maps, images, etc.) generated using one or more in-cabin optical image sensors 102 and/or depth-perception sensors 104, (such as one or more cameras, RADAR sensor(s), ultrasonic sensor(s), LIDAR sensor(s)) and/or the like. The sensor data 105 may correspond to sensors with a sensory field or field of view internal to the vehicle 1000. In some embodiments, the sensor data 105 may correspond to sensor data generated using one or more external sensors of the vehicle 1000, such as one or more cameras, RADAR sensor(s) 1060, ultrasonic sensor(s) 1062, LIDAR sensor(s) 1064, and/or the like. As such, sensor data 105 may correspond to sensors with a sensory field or field of view at least partially external to the vehicle 1000 (e.g., cameras, RADAR, LIDAR, ultrasonic sensors, etc. with sensory fields at least partially including the environment exterior to the vehicle 1000).

As illustrated in FIG. 1, interior monitoring system 120 may further receive, as input, calibration parameters 119 computed by a calibrator 110, that are used by the interior monitoring system 120 to cross-correlate detected features between the optical image sensor data 106 and depth-perception sensor data 108. More specifically, the calibrator 110 may generate one or more calibration parameters 119 that comprises a rotation-translation transform that describes the relative rotation and translation of an optical image sensor 102 with respect to a depth-perception sensor 104. The rotation-translation transform may be used by the interior monitoring system 120 to map the 3D coordinates of features appearing in the depth-perception sensor data 108 to the 2D image frame coordinates of the optical image sensor data 106, and vice versa, to map the 2D coordinates of features appearing in the optical image sensor data 106 to the 3D image frame coordinates of the depth-perception sensor data 108. The rotation-translation transform may be computed by the calibrator 110 and used by the interior monitoring system 120, or other components of vehicle 1000, to coherently process the optical images sensor data 106 and depth-perception sensor data 108. For a non-limiting example, the interior monitoring system 120 may include one or more DNN(s) 122 that may process optical images sensor data 106 and depth-perception sensor data 108 corresponding to features of humans and/or animals, such as eyes, face, legs, and correlate the location of those features between optical images sensor data 106 and depth-perception sensor data 108 to detect when and where a humans and/or animal is present within the interior space of the vehicle 1000.

As further illustrated in FIG. 1, the calibrator 110 may compute the rotation-translation transform calibration parameters for interior monitoring system 120 using sensor data 105 inputs that include the optical image sensor data 106 and the depth-perception sensor data 108, and inputs 3D reconstruction sensor data 107 generated using one or more 3D reconstruction sensors 106. The calibrator 110 may include a 3D reconstruction function 112, an optical image intermediate transform computation function 114 (e.g., to compute H2), a depth-perception intermediate transform computation function 116 (e.g., to compute H1), and a calibration parameter transform computation function 118 (e.g., to compute H3), which are described in further detail herein.

The sensor data 105 used by the calibrator 110 corresponds to a plurality of hybrid calibration targets 130 that are distributed across a field of view within the interior space of vehicle 1000. These plurality of hybrid calibration targets 130 are positioned at locations within the vehicle interior space to define a frame of reference for the 3D intermediary coordinate system. The 3D intermediary coordinate system may be referred to as a "hybrid" interior 3D coordinate system because both depth-perception sensor data and optical image sensor data may be translated to the intermediary coordinate system to form a coherent holistic set of sensor data for detecting and/or classifying motion occurring within the vehicle interior space.

Figure 2A:
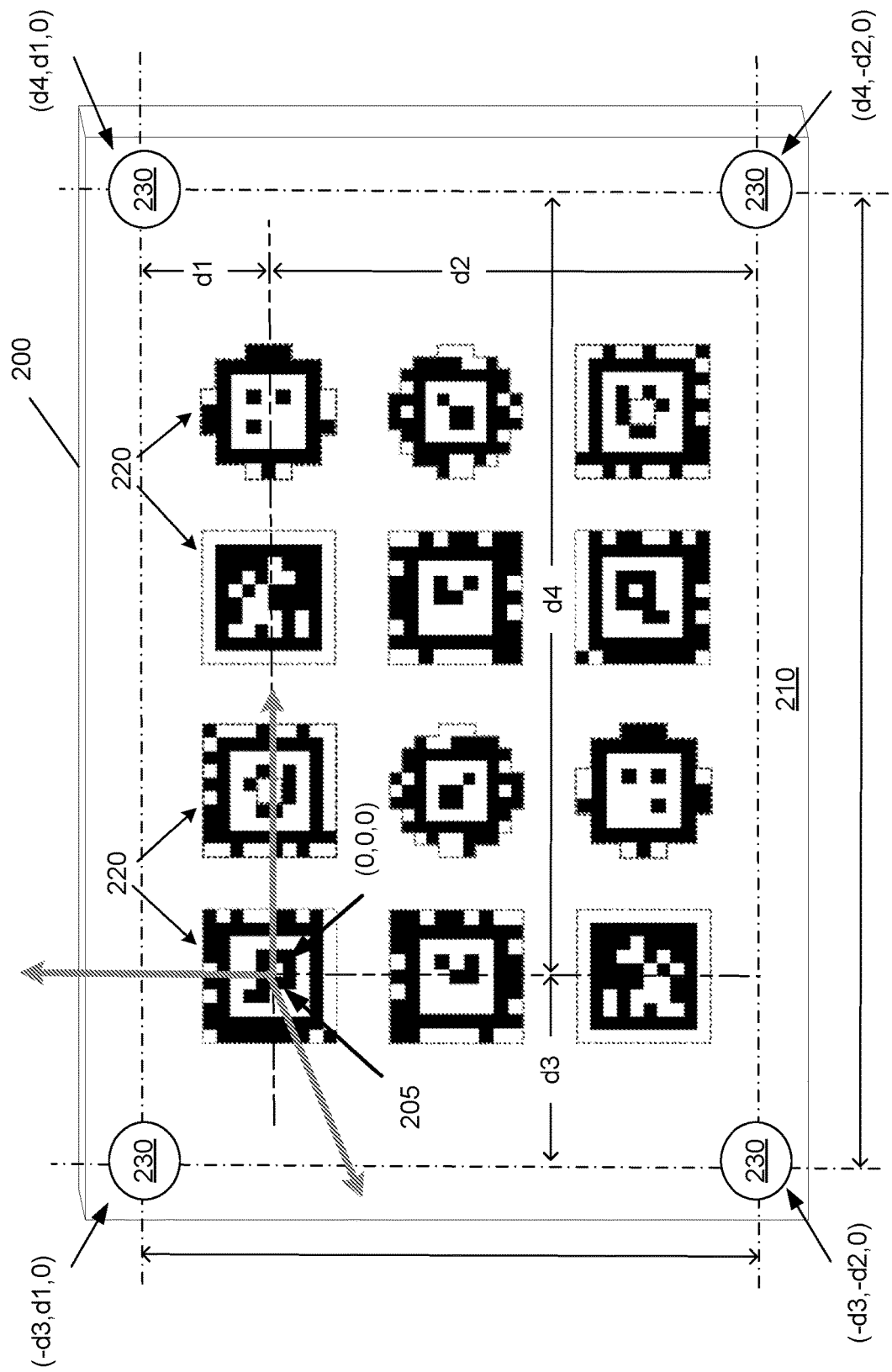
FIG. 2A is an example hybrid calibration tool, in accordance with some embodiments of the present disclosure.

Turning now to FIG. 2A, FIG. 2A is an example of a hybrid calibration target 200 according to an embodiment of the present disclosure. As shown in FIG. 2A, the hybrid calibration target 200 may comprise a structural substrate 210, for example, a generally planar board or sheet of rigid material. The hybrid calibration target 200 may further include one or more fiducial point markers 220 and one or more motion targets 230, which may be secured to the structural substrate 210. The one or more fiducial point markers 220 may comprise an array of visual fiducial system patterns, such as, but not limited to, AprilTag patterns or other patterns that facilitate computing precise 3D position, orientation, and/or identify of the fiducial point markers 220. The one or more motion targets 230 may comprise a moving (e.g., rotating) component, and may be positioned adjacent to the one or more fiducial point markers 220. The motion targets 230 may include, for example, an electric motor integrated with the structural substrate 210, and include, for example, a signal reflecting target that rotates when the electric motor is energized. The structural substrate 210 may be comprised of a material that dampens vibrations produced by movement of the motion targets 230 (e.g., a metal or composite material). In some embodiments, to dampen vibrations, the signal reflecting target may extend through a hole in the structural substrate so that the motion target 230 is not rigidly attached to the structural substrate. For example, motion targets 230 may be mounted to the structural substrate 210 via one or more vibration attenuating materials (e.g., via an elastomer coupling). By damping vibrations, the location of the motion targets 230 may be readily differentiated by a depth-perception sensor 104 from the relatively motion-free structural substrate 210 and fiducial point markers 220. The fiducial point markers 220 may include visual fiducial system patterns, such as, but not limited to, AprilTag patterns or other patterns that facilitate computing precise relative 3D position and orientation of the hybrid calibration target 200 with respect to the other hybrid calibration targets 200 located in the interior space. The fiducial point markers 220 function as targets for detection by an optical image sensor 102 while the motion targets 230 function as targets for detection by a depth-perception sensor 104.

In some embodiments, the origin for the local coordinate system for the hybrid calibration target 200 may be defined based on one of the fiducial point markers 220. In the example hybrid calibration target 200 of FIG. 2, the local origin of the local coordinate system is shown as the center point of the top left fiducial point marker, denoted by the 3D (x, y, z) coordinates of (0, 0, 0) shown at 205. The relative fixed coordinates of the other fiducial point markers 220 and the motion targets 230 may be referenced in the local coordinate system of hybrid calibration target 200 with respect to this local origin 205 at (0, 0, 0), and are readily determined based on either direct measurements of distances, or fabrication specifications. For example, in FIG. 2, the upper two motion targets 230 are offset from the local origin 205 in the positive vertical (y-axis) direction by distance d1, while the upper two motion targets 230 are offset from the local origin 205 in the negative vertical (y-axis) direction by distance d2. The right two motion targets 230 are offset from the local origin 205 in the positive horizontal (x-axis) direction by distance d4, while the left two motion targets 230 are offset from the local origin 205 in the negative horizontal (x-axis) direction by distance d3. In this example, the motion targets 230 are all co-planar in the z-axis direction with the fiducial point markers 220. Accordingly, the coordinates of the motion targets 230 in the local coordinate system may be expressed as: upper left motion target 230 (−d3, d1, 0), upper right motion target 230 (d4, d1, 0), lower left motion target 230 (−d3, −d2, 0) and lower right motion target 230 (d4, −d2, 0). In the same way, coordinates in the local coordinate system for any of the other fiducial point markers 220 may be determined based on the horizontal and vertical offsets of their respective center points from the local origin 205.

Figure 2B:
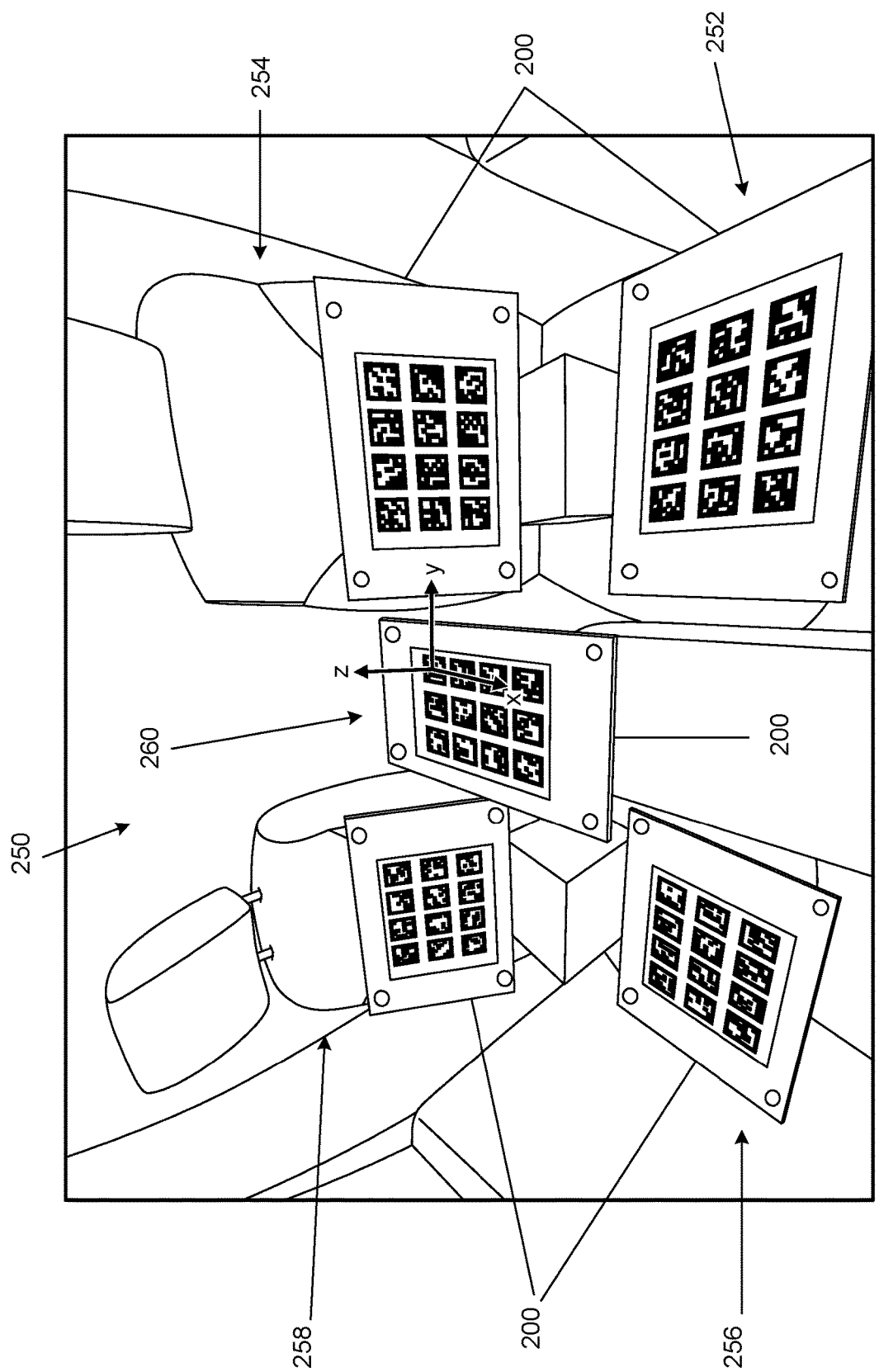
FIG. 2B is an example of placement of a plurality of hybrid calibration tools within an interior space of a vehicle, in accordance with some embodiments of the present disclosure.

The positioning of a plurality of hybrid calibration targets, such as hybrid calibration target 200, established a framework within the interior space from which the calibrator 110 can generate the 3D intermediary coordinate system, and compute the H1 and H2 rotation-translation transforms. For example, FIG. 2B illustrates an example placement of a plurality of hybrid calibration targets 200 within the interior space 250 of a vehicle such as vehicle 1000. To build the 3D intermediary coordinate system for this vehicle interior space 250, a plurality of the hybrid calibration targets 200 may be positioned across the volume of space for which vehicle interior monitoring may be implemented. The hybrid calibration targets 200 may be located such that they appear within an overlapping field of view of both the depth-perception sensor(s) 104 and the optical image sensor(s) 102 that are being calibrated together.

The number of hybrid calibration targets 200 used within the interior space 250 may vary as a function of the size of the interior space 250, but generally should be distributed to span the area to be monitored, have a diversity of alignments (for example, arranged to align with at least two distinct intersecting planes within the interior space 250) and be sufficient in number to produce robust H1, H2, H3 transforms. For a non-limiting example, in a typical vehicle cabin of a consumer automobile, five hybrid calibration targets 200 may be used, with a hybrid calibration target 200 positioned on the driver's seat cushion (shown at 252), a hybrid calibration target 200 positioned on the driver's seat back cushion (shown at 254), a hybrid calibration target 200 positioned on the front passenger's seat cushion (shown at 256), a hybrid calibration target 200 positioned on the front passenger's seat back cushion (shown at 258), and a hybrid calibration target 200 positioned on the center console between the driver's seat and the front passengers seat (shown at 260). The two hybrid calibration targets 200 positioned on the seat cushions 252, 256 and on the center console 260 would thus be aligned to an approximately horizontal plane, and the hybrid calibration targets positioned on the seat back cushions 254, 258 aligned to an approximately vertical plane. This positioning would approximately fill the field of view illustrated in FIG. 2B, which may represent the perspective of overhead depth-perception and optical image sensors (e.g., looking into the vehicle cabin from the rear-view mirror position). It should be understood that the number and placement of hybrid calibration targets 200 in FIG. 2B are for illustrative purposes only and that other implementations may use a different number of hybrid calibration targets 200 located in different positions. Note that in some embodiments, the depth-perception sensor 104 and optical image sensors 102 may be separated in distance as long as they have at least a partially shared field of view or sensory field. In some embodiments, because the center console 260, typically, may be located at an approximately centralized location in the vehicle interior, the local origin 205 of the hybrid calibration target 200 positioned on the center console 260 may be selected to define the origin of the 3D intermediary coordinate system. This hybrid calibration target 200 that defines the origin of the 3D intermediary coordinate system may be referred to as the reference calibration target.

Returning again to FIG. 1, the aspect of executing a 3D reconstruction to generate the 3D intermediary coordinate system may be performed by the 3D reconstruction function 112 of the calibrator 110 using 3D reconstruction data 107. 3D reconstruction data 107 may include a plurality of image frames of the one or more (e.g., plurality) of hybrid calibration targets 200 positioned within the vehicle interior (e.g., such as shown in FIG. 2B). The 3D reconstruction data 107 may be captured using one or more 3D reconstruction sensors 103 that have known intrinsic parameters (such as a camera, RGB sensor, Infrared sensor (IR), depth sensor or other optical sensors, for example). The 3D reconstruction sensors 103 may include one or more of the optical image sensors 102 and/or include one or more distinct sensors separate from the optical image sensor(s) 102.

Figure 3:
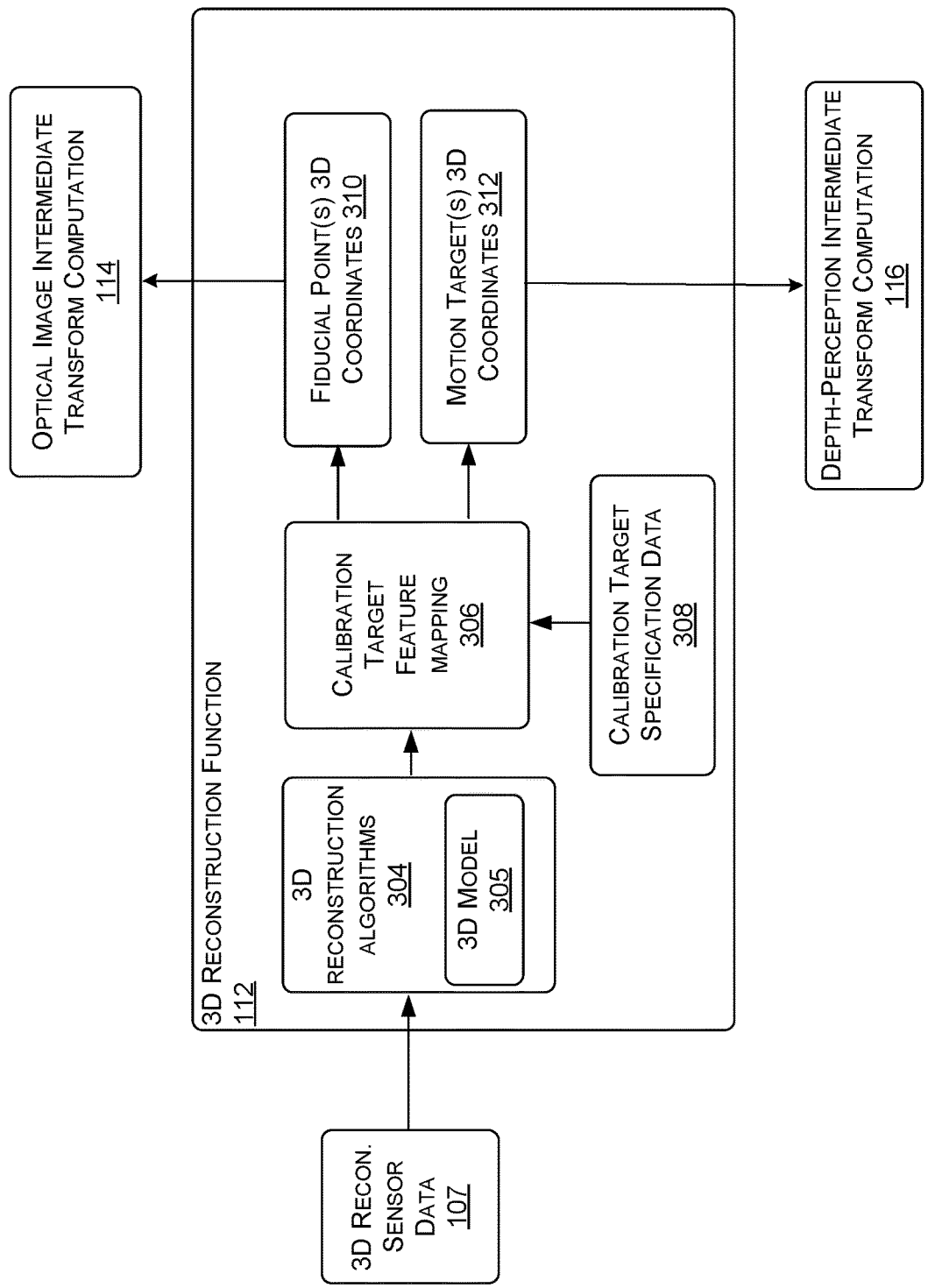
FIG. 3 is an example illustration of a 3D reconstruction function, in accordance with some embodiments of the present disclosure.

Tuning to FIG. 3, the 3D reconstruction function 112 is shown as comprising one or more 3D reconstruction algorithms 304 and a calibration target feature mapping function 306. Based on the set of image frames from the 3D reconstruction data 103, the 3D reconstruction algorithm(s) 304 generates a 3D model 305 of the vehicle interior space based on the 3D intermediary coordinate system. For example, in some embodiments, the 3D reconstruction algorithm(s) 304 take as input a plurality of images frames (e.g., on the order of 20 images) from the 3D reconstruction data 107, the plurality of images frames capturing each of the hybrid calibration targets 200 with their respective fiducial point markers 220 clearly visible. Applying the plurality of image frames and the known intrinsic parameters of the 3D reconstruction sensors 103 as input, the 3D reconstruction algorithm(s) 304 may generate a rotation-translation transform (e.g., a transformation matrix) that maps between the local coordinate system of each of the hybrid calibration targets 200 to the 3D intermediary coordinate system of the 3D model 305 generated by the 3D reconstruction algorithm(s) 304. As previously discussed with respect to FIGS. 2A and 2B, the local origin 205 of one of the hybrid calibration targets 200 may be used by the 3D reconstruction algorithm(s) 304 to define an origin of the 3D intermediary coordinate system. The 3D model 305 generated by the 3D reconstruction algorithm(s) 304 uses the 3D intermediary coordinate system to thus link all of the hybrid calibration targets 200 to a common origin and coordinate system definition. As a non-limiting example, the 3D reconstruction algorithm(s) 304 may comprise one or more computer vision algorithms to generate the 3D model 305 and 3D intermediary coordinate system, such as an algorithm based on the Eigen library, OpenCV open source computer vision library, bundle adjustment optimization, RANSAC optimization, or other algorithm.

In some embodiments, the calibration target feature mapping function 306 uses the 3D model 305 to compute 3D coordinates in the 3D intermediary coordinate system for each of the one or more fiducial point markers 220 and one or more motion targets 230 of the hybrid calibration targets 200 captured in the image frames of the 3D reconstruction data 107. For example, in some embodiments, the 3D model 305 defines coordinates, in the 3D intermediary coordinate system, that correspond to the local origins 205 of each of the hybrid calibration targets 200. The 3D model 305 further defines the relative poses (e.g., the rotation-translation transforms) of each of the hybrid calibration targets 200 with respect to the 3D intermediary coordinate system. Moreover, for each hybrid calibration target 200, the relative local coordinates of the fiducial point markers 220 and motion targets 230 with respect to the local origin 205 may be determined as discussed with respect to FIG. 2A, and stored as calibration target specification data 308. Accordingly, given this information from the 3D model 305 and calibration target specification data 308, the calibration target feature mapping function 306 may compute fiducial point 3D coordinates 310 and motion target 3D coordinates 312. The fiducial point 3D coordinates 310 include the 3D coordinates, in the 3D intermediary coordinate system, corresponding to the fiducial point markers 220 of the plurality of hybrid calibration targets 200. As discussed herein, the fiducial point 3D coordinates 310 may be used by the optical image intermediate transform computation function 114 for computing the rotation-translation transform H2. The motion target 3D coordinates 312 include the 3D coordinates, in the 3D intermediary coordinate system, corresponding to the motion target 230 of the plurality of hybrid calibration targets 200. As discussed herein, the motion target 3D coordinates 312 may be used by the depth-perception intermediate transform computation function 116 for computing the rotation-translation transform H1. In some embodiments, the fiducial point 3D coordinates 310 and motion target 3D coordinates 312 computed by the calibration target feature mapping function 306 may be saved to the 3D model 305.

Figure 4:
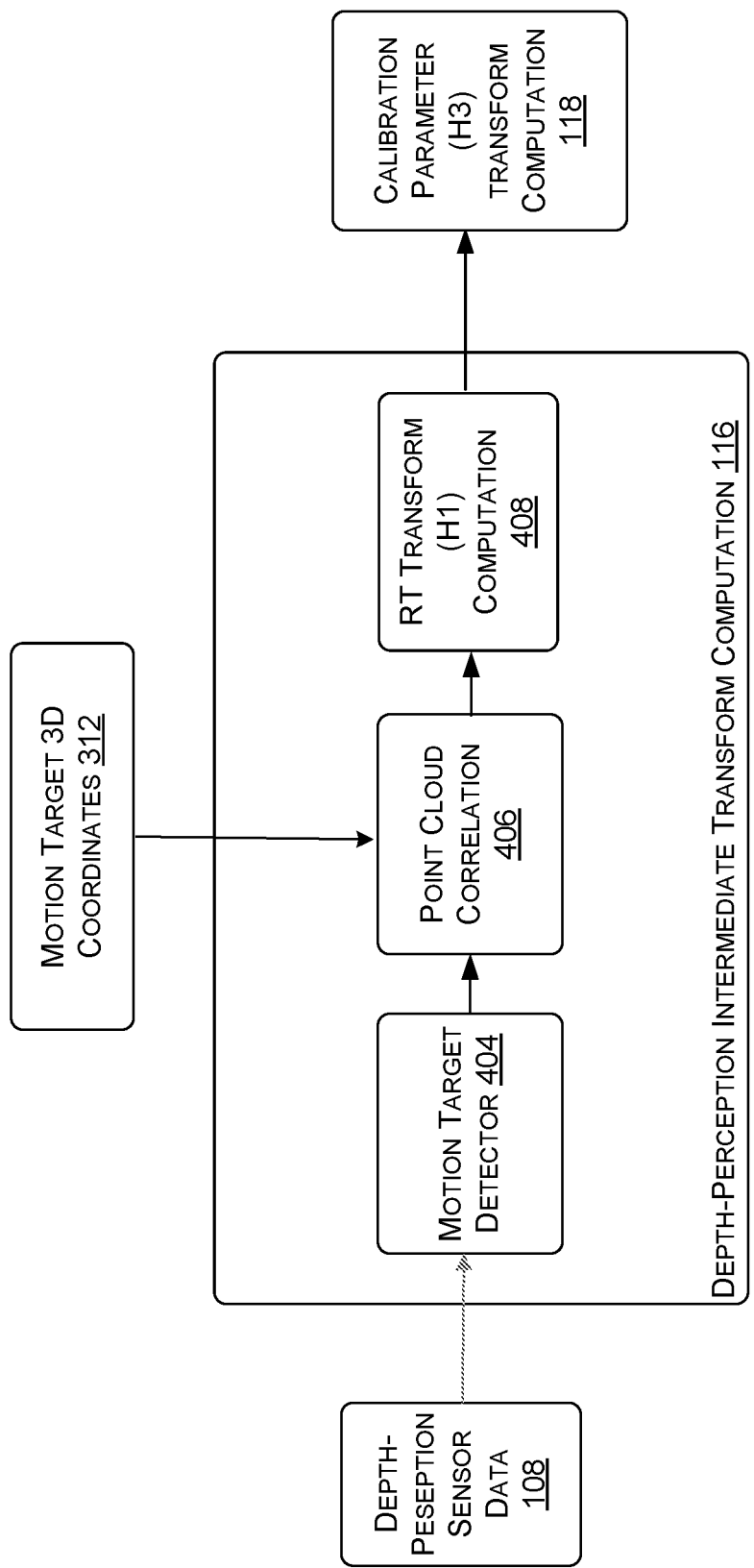
FIG. 4 is an example illustration of a depth-perception intermediate transform computation function, in accordance with some embodiments of the present disclosure.

Referring now to FIG. 4, FIG. 4 illustrates an example depth-perception intermediate transform computation function 116, for computing the H1 rotation-translation transform between the 3D coordinate system of depth-perception sensor 104 and the 3D intermediary coordinate system generated by the 3D reconstruction function 112. With the motion targets 230 of the plurality of hybrid calibration targets 200 activated, depth-perception sensor data 108 may be captured by the depth-perception sensor 104. The depth-perception sensor data 108 may include a point cloud that includes 3D position data for the activated motion targets 230 within the field of view or sensory field of the depth-perception sensor 104. In some embodiments, the depth-perception intermediate transform computation function 116 includes motion target detector 404, point cloud correlation 406 and rotation-translation transform (H1) computation 408. The motion target detector 404 inputs and processes the depth-perception sensor data 108 to determine the 3D point cloud coordinates corresponding to the activated motion targets 230. Ideally, during the calibration process, the activated motion targets 230 are the only or primary sources of motion within the vehicle interior space so that the activated motion targets 230 return a signal to the depth-perception sensor 104 clearly discernable in the 3D point cloud as indicating the location of a motion target 230. That said, in some embodiments, the motion target detector 404 may comprise one or more filter algorithms that attenuate stray return signals caused by moving objects other than the activated motion targets 230.

In some embodiments, the depth-perception intermediate transform computation function 116 includes point cloud correlation 406, which functions to associate (e.g., match) each motion target represented in the 3D point cloud (e.g., sensed by the depth-perception sensor 104) with that respective motion target as represented in the motion target 3D coordinates 312 (e.g., computed by the 3D reconstruction function 112). For example, the point cloud correlation 406 may comprise a 3D feature matching algorithm that pairs a motion target from the 3D point cloud with a motion target from motion target 3D coordinates 312 predicted to correspond to the same physical motion target 230 in the vehicle interior space.

In embodiments, a set of pairwise 3D data may be generated by the point cloud correlation 406 that includes a 3D data pair for individual motion targets of the motion targets 230. That is, for each of the activated motion targets 230, a 3D data pair may include: a) 3D coordinates of the motion target 230 in the point cloud coordinate system of the depth-perception sensor 104, and b) the 3D coordinates of the motion target 230 in the 3D intermediary coordinate system as provided by the motion target 3D coordinates 312. To compute the H1 rotation-translation transform, the rotation-translation transform computation 408 may execute an optimization algorithm, such as a least-square method algorithm, to the set of pairwise 3D data. Using the set of pairwise 3D data, the rotation-translation transform computation 408 may derive the transform H1 by computing and minimizing re-projection errors across the plurality of motion targets within the field of view of the depth-perception sensor 104. In some embodiments, the rotation-translation transform computation 408 iteratively derives a transformation H1 that attempts to optimize the mapping of motion target coordinates between the depth-perception sensor's 3D point cloud coordinate system and the 3D intermediary coordinate system. The computed H1 transform may be saved to memory as an extrinsic calibration parameter corresponding to the depth-perception sensor 104.

In some embodiments, to validate the accuracy of the H1 transformation, the predicted 3D coordinates computed for a motion target in the 3D intermediary coordinate system, the 3D coordinates in the point cloud coordinate system may be computed as a function of the estimated H1 transform and re-projected into the point cloud coordinate system as a validation point.

Figure 5:
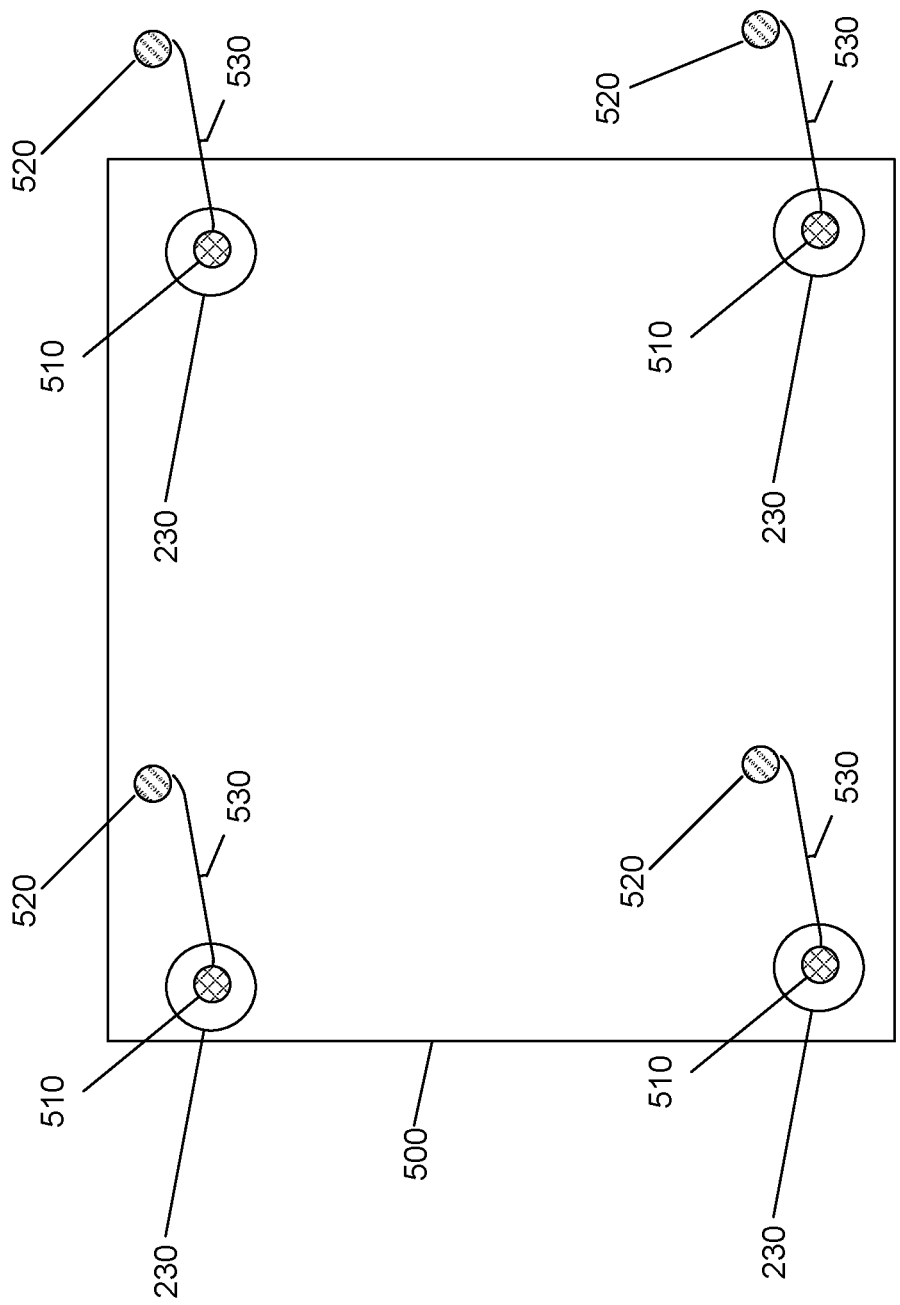
FIG. 5 is an example illustration of re-projecting 3D coordinates of a motion target to determine an accuracy of an estimated rotation-translation transform, in accordance with some embodiments of the present disclosure.

For example, referring now to FIG. 5, the 3D point cloud positions of one or more motion targets 230 may define one of more calibration points 510. The 3D coordinates for these calibration points 310 in the 3D intermediary coordinate system may be know from the motion target 3D coordinates 312 generated by the 3D reconstruction process. Using the rotation-translation transform H1 computed for the depth-perception sensor 104 by the 3D reconstruction function 112, 3D validation points 520 (e.g., each corresponding to one of the calibration points 510) may be computed and projected back onto the point cloud. The 3D coordinates of the computed validation points 520 may be compared to the 3D coordinates of the corresponding calibration points 510 that are derived from the point cloud. The deviations 530 between the coordinates of the validation points 520 and the coordinates of the calibration points 510 may indicate a calibration error in the rotation-translation transform H1 previously computed by the intermediate transform computation function 114. In some embodiments, calibration errors computed for a plurality of motion targets 230 may similarly be determined and an aggregate calibration accuracy metric computed.

Figure 6:
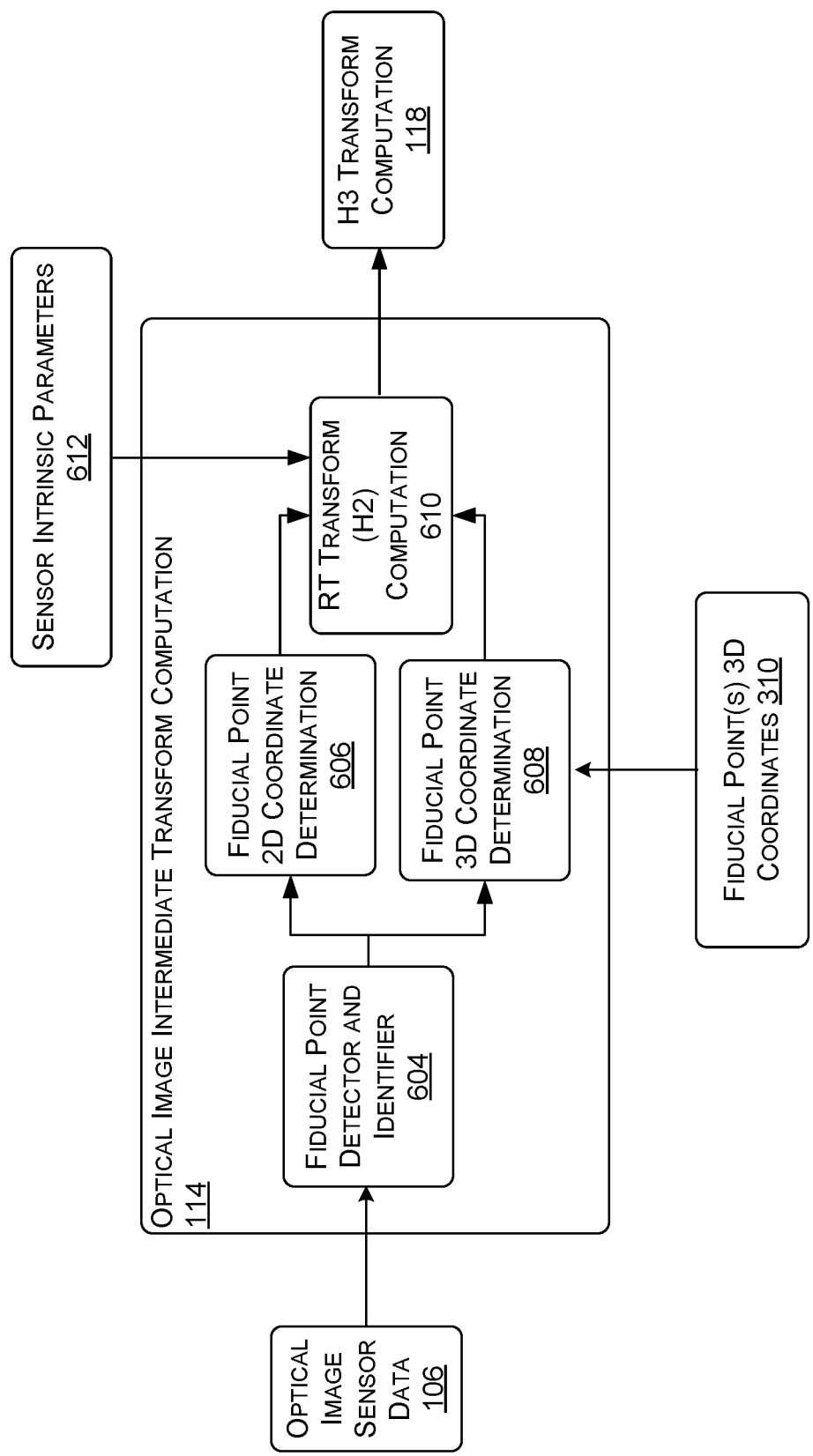
FIG. 6 is an example illustration of an optical image intermediate transform computation function, in accordance with some embodiments of the present disclosure.

Referring now to FIG. 6, FIG. 6 illustrates an example optical image intermediate transform computation function 114 for computing the H2 rotation-translation transform between the 2D coordinate system of optical image sensor 102 and the 3D intermediary coordinate system generated by the 3D reconstruction function 112. As shown in FIG. 6, the optical image intermediate transform computation function 114 may comprise a fiducial point detector and identifier 604, a fiducial point 2D coordinate determination function 606, a fiducial point 3D coordinate determination function 608, and a rotation-translation transform (H2) computation function 610.

Input to the optical image intermediate transform computation function 114 may include, but is not limited to, optical image sensor data 106, sensor intrinsic parameters 612 (corresponding to the intrinsic parameters of optical image sensor 102), and fiducial point 3D coordinates 310. The fiducial point detector and identifier 604 may analyze the optical image sensor data 106 to detect the presence of one or more fiducial point markers 220 of the plurality of hybrid calibration targets 200.

The fiducial point detector and identifier 604 may execute one or more machine learning algorithms, deep neural networks, computer vison algorithms, image processing algorithms, mathematical algorithms, and/or other technologies, to determine whether images of one or more fiducial points exist within optical image sensor data 106 and/or which portion of the optical image sensor data 106 includes the one or more fiducial point markers 220. For example, the fiducial point detector and identifier 604 and/or other components of the optical image intermediate transform computation function 114, may be implemented using any type of machine learning model or algorithm, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short term memory/LSTM, Hopfield, Boltzmann, deep belief, deconvolutional, generative adversarial, liquid state machine, etc.), areas of interest detection algorithms, computer vision algorithms, and/or other types of algorithms or machine learning models.

Figure 7:
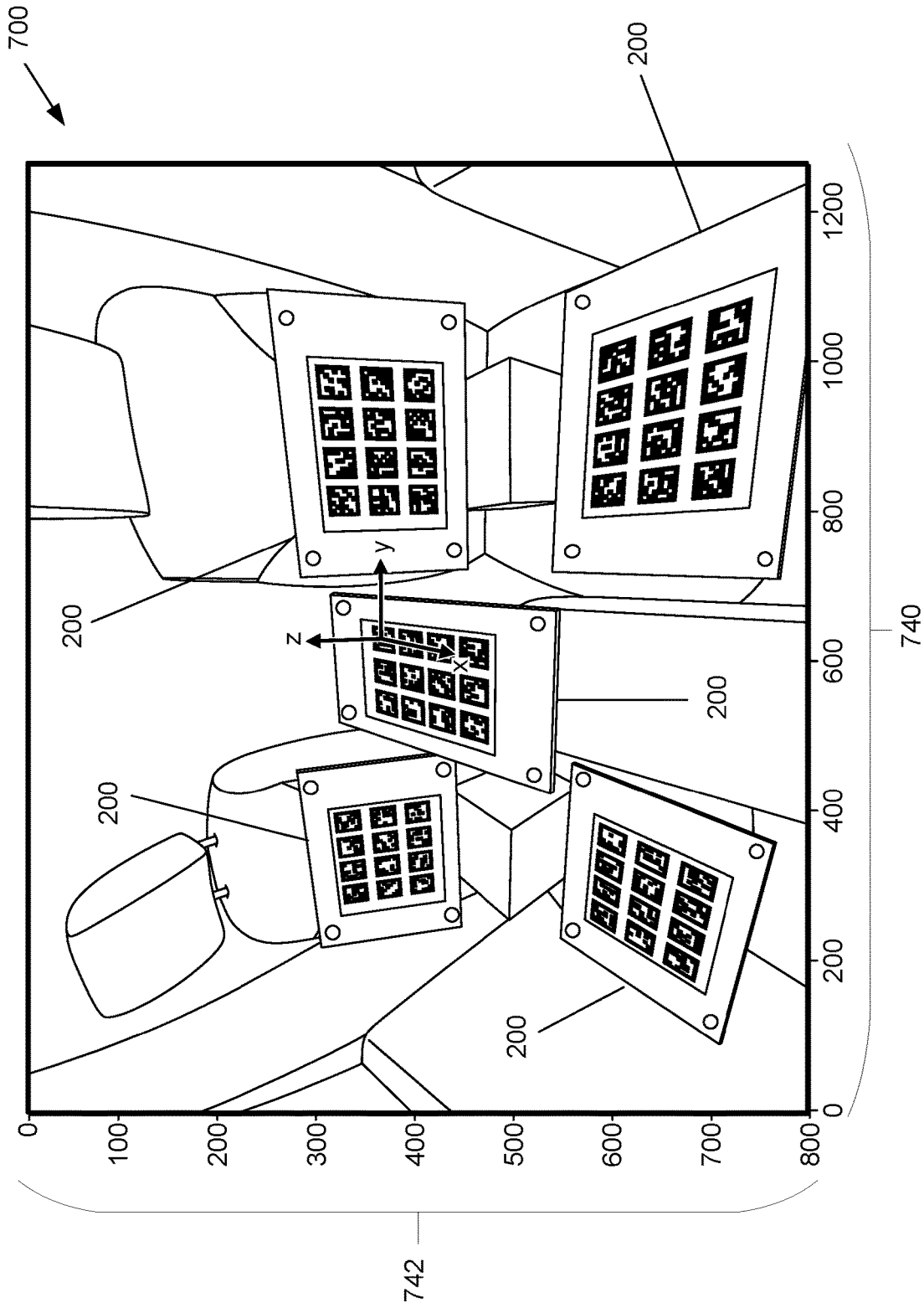
FIG. 7 is an example of a 2D image frame capturing placement of a plurality of hybrid calibration tool within an interior space of a vehicle, in accordance with some embodiments of the present disclosure.

For a set of one or more of the fiducial point markers 220 detected by the fiducial point detector and identifier 604, the fiducial point 2D coordinate determination function 606 determines a 2D coordinate within the image space of an image frame of the optical image sensor data 106. For example, FIG. 7 is an example image frame 700 from optical image sensor data 106 captured by optical image sensor 102. Image frame 700 captures the plurality of hybrid calibration targets 200 with their respective one or more fiducial point markers 220. From image frame 700, 2D coordinates u, v may be established for individual fiducial point markers 220 based on the location of the fiducial point marker 220 with respect to the horizontal u-axis 740 and vertical v-axis 742 of the image space. For example, the 2D coordinates of a fiducial point markers 220 may be defined using one or more designated corner points, or a center point, of the fiducial point markers 220. In some embodiments, fiducial point markers 220 may embed within their pattern a notion of orientation from which the fiducial point 2D coordinate determination function 606 may determine what point(s) on the fiducial point markers 220 is used to define its location.

For the set of one or more of the fiducial point markers 220, the optical image intermediate transform computation function 114 uses the fiducial point 3D coordinate determination function 608 to determine a 3D coordinate with respect to the intermediate 3D coordinate system. Fiducial point markers 220 may further include an encoded identifier (such as pattern or code) readable by the optical image sensor 102. Using the encoded identifier, the fiducial point 3D coordinate determination function 608 may reference fiducial point 3D coordinates 310 to lookup the 3D coordinate for fiducial point markers 220 with respect to the intermediate 3D coordinate system.

As such, for each of the fiducial point markers 220 detected by the fiducial point detector and identifier 604, the optical image intermediate transform computation function 114 determines both a 2D coordinate (u, v) with respect to the image frame coordinate system, and a 3D coordinate (x, y, z) with respect to the intermediate 3D coordinate system. Using the pair of corresponding 2D coordinates (u, v) and 3D coordinates (x, y, z) for one or more of the fiducial point markers 220 and the sensor intrinsic parameters 612 (e.g., focal length parameters $f_x$ and $f_y$, sensor principal point parameters $u_0$ and $v_0$ and/or optical distortion coefficient $\gamma$), the rotation-translation transform (H2) computation function 610 may apply a transform computation that comprises a pose computation algorithm to compute a rotation-translation transform H2 for an optical image sensor 102. For example, rotation-translation transform (H2) computation function 610 may compute a rotation-translation transform H2 as an RT matrix comprising a rotation vector (R) and translation vector (T) as discussed above with respect to the expression:

$$s \begin{bmatrix} u \\ v \\ 1 \end{bmatrix} = \begin{bmatrix} f_x & \gamma & u_0 \\ 0 & f_y & v_0 \\ 0 & 0 & 1 \end{bmatrix} [R \mid T] \begin{bmatrix} x \\ y \\ z \\ 1 \end{bmatrix}$$

Although the rotation-translation transform (e.g., RT) H2 may be computed using a single fiducial point's pair of corresponding 2D coordinates and 3D coordinates, greater accuracy may be achieved by optimizing 2D-3D coordinate pairs for a plurality of fiducial point markers. For example, in some embodiments, the pose computation algorithm applied by the rotation-translation transform (H2) computation function 610 iteratively computes the RT matrix to converge on a set of R and T values that fit the 2D and 3D coordinates of the set of coordinate pairs of the detected fiducial point markers 220. In this way, the pose computation algorithm may compute an (e.g., optimized) translation-rotation matrix corresponding to the extrinsic pose of the optical image sensor 102. The OpenCV algorithm solvePnP is one example of a pose computation algorithm that may be applied by the rotation-translation transform (H2) computation function 610 to estimate rotation (R) and translation (T) vectors to derive the rotation-translation transform H2.

Figure 8:
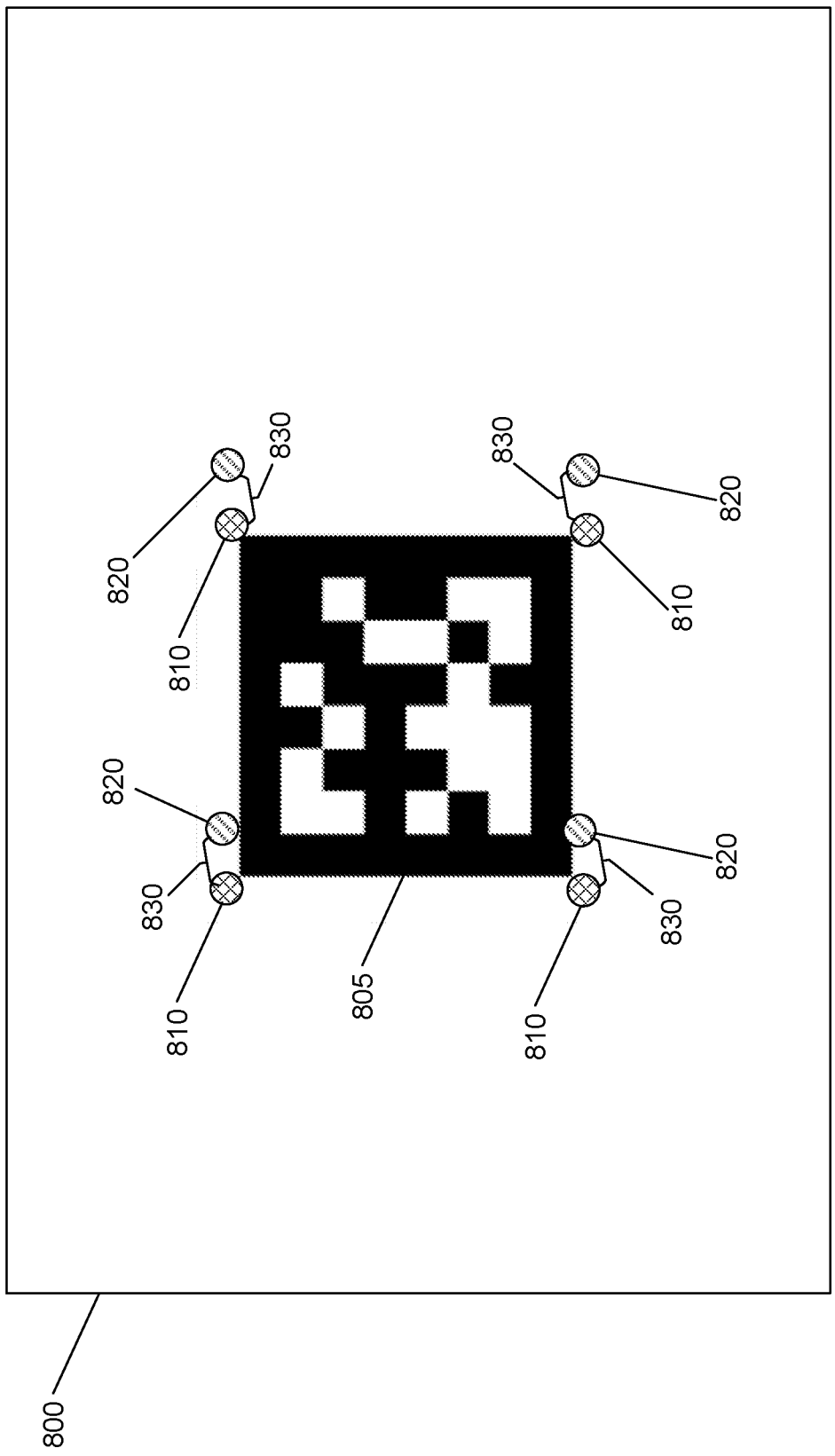
FIG. 8 is an example illustration of re-projecting 2D coordinates of a fiducial point marker to determine an accuracy of an estimated rotation-translation transform, in accordance with some embodiments of the present disclosure.

In some embodiments, the accuracy of the estimated rotation-translation transform H2 computed by the optical image intermediate transform computation function 114 may be determined by re-projecting the known 3D coordinates of one or more fiducial point markers back into an image of the fiducial point markers captured by an optical image sensor 102. For example, referring now to FIG. 8, one or more corners of given fiducial point 805 may define one of more calibration points 810. The 3D coordinates ($x_i, y_i, z_i$) for these calibration points 810 of fiducial point 805 with respect to the intermediate 3D coordinate system may be known coordinates, for example from the fiducial point 3D coordinate 310 computed by the 3D reconstruction function 112. Using an image frame 800 captured by the optical image sensor 102, and the rotation-translation transform computed for that optical image sensor 102 by the optical image intermediate transform computation function 114, 2D validation points 820 (e.g., each corresponding to one of the calibration points 810) may be computed and projected back onto the image frame 800. The 2D coordinates of the computed validation points 820 may be compared to the 2D coordinates of the corresponding calibration points 810 that are derived from the captured image frame 800. The deviations 830 between the coordinates of the validation points 820 and the coordinates of the calibration points 810 captured in the image frame 800 may indicate a calibration error in the rotation-translation transform H2 previously computed by the optical image intermediate transform computation function 114. In some embodiments, calibration errors computed for a plurality of fiducial point markers 220 from the captured image frame 800 may similarly be determined and an aggregate calibration accuracy metric computed.

Given as inputs the rotation-translation transform H1 computed by the depth-perception intermediate transform computation function 116 and the rotation-translation transform H2 computed by the optical image intermediate transform computation function 114, the calibration parameter transform computation function 118 may compute the rotation-translation transform H3 as a function of H2 and H1, for example, using H3=H2×H1. Using the rotation-translation transform H3 as a calibration parameter, the interior monitoring system 120 may map the 3D coordinates of features appearing in the depth-perception sensor data 108 to the 2D image frame coordinates of the optical image sensor data 106, and vice versa, map the 2D coordinates of features appearing in the optical image sensor data 106 to the 3D image frame coordinates of the depth-perception sensor data 108. The interior monitoring system 120 may, for example, use this calibration parameter to generate updated sensor data comprising a coherent set of sensor data from the combination of these sensors that may be cross-referenced between depth-perception sensor data and image frame sensor data, and/or use the calibration parameter to operate on one or more layers on the DNN(s) 122.

Now referring to FIG. 9, FIG. 9 is a flow diagram showing a method 900 for depth sensor to image sensor extrinsic parameter calibration, in accordance with some embodiments of the present disclosure. It should be understood that the features and elements described herein with respect to the method 900 of FIG. 9 may be used in conjunction with, in combination with, or substituted for elements of, any of the other embodiments discussed herein and vice versa. Further, it should be understood that the functions, structures, and other descriptions of elements for embodiments described in FIG. 9 may apply to like or similarly named or described elements across any of the figures and/or embodiments described herein and vice versa.

Each block of method 900, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 900 is described, by way of example, with respect to the calibrator 110 and interior monitoring system 120 of FIG. 1. However, these methods may additionally or alternatively be executed by any one system, or any combination of systems, including, but not limited to, those described herein.

The method 900, at block B902, includes determining, based at least on image data generated using an image sensor and corresponding to one or more calibration targets positioned within an interior space of a machine, a first transform between a three-dimensional (3D) intermediary coordinate system and a two-dimensional (2D) image coordinate system corresponding to the image sensor. The calibration target(s), such as hybrid calibration targets 200, are positioned at locations within the vehicle interior space to define a frame of reference for the 3D intermediary coordinate system, such as shown in FIG. 2B. A hybrid calibration target may comprise a structural substrate, and further include one or more fiducial point markers (such as fiducial point markers 220) and one or more motion targets (such as motion targets 230), which may be secured to the structural substrate. In some embodiments, the three-dimensional intermediary coordinate system may be generated using 3D reconstruction algorithms that generate a 3D model of the interior space from a set of images of the plurality of hybrid calibration targets. For example, in some embodiments, the 3D reconstruction function 112 of the calibrator 110 uses 3D reconstruction data 107 comprising images of the plurality of hybrid calibration targets to generate a 3D model 305 of the interior space that defines the three-dimensional intermediary coordinate system. The 3D reconstruction function 112 may further generate a set of fiducial point 3D coordinates 310 (in the three-dimensional intermediary coordinate system) corresponding to the fiducial point markers of the plurality of hybrid calibration targets. The calibrator 110 uses the fiducial point 3D coordinates 310 and 2D coordinates for the fiducial point markers extracted from optical image sensor data 106 to compute the rotation-translation transform H2. For example, in some embodiments, the pose computation algorithm applied to iteratively compute a rotation-translation matrix to converge on a set of rotation and translation vectors that optimally fit the 2D and 3D coordinates of the set of coordinate pairs of the detected fiducial point markers 220. In this way, the pose computation algorithm may compute an (e.g., substantially optimized) translation-rotation matrix corresponding to the extrinsic pose of the optical image sensor 102. The OpenCV algorithm solvePnP is one example of a pose computation algorithm that may be applied by the rotation-translation transform (H2) computation function 610 to estimate rotation (R) and translation (T) vectors to derive the rotation-translation transform H2.

The method 900, at block B904, includes determining, based at least on sensor data generated using the depth sensor and corresponding to at least one calibration target of the one or more calibration targets, a second transform between the 3D intermediary coordinate system and a 3D coordinate system corresponding to the depth sensor. For example, in some embodiments, the 3D reconstruction function 112 may further generate a set of motion target 3D coordinates 312 (in the three-dimensional intermediary coordinate system) corresponding to the motion targets of the plurality of hybrid calibration targets. The calibrator 110 uses the motion target 3D coordinates 312 and 3D coordinates for the motion targets determined from depth-perception sensor data 108 to compute the rotation-translation transform H1. In embodiments, a set of pairwise 3D data may be generated by the calibrator 110 that includes a 3D data pair for each of the motion targets. For example, for each of the motion targets 230, a 3D data pair may be generated that includes: a) 3D coordinates of the motion target 230 in the point cloud coordinate system of the depth-perception sensor 104, and b) the 3D coordinates of the motion target 230 in the 3D intermediary coordinate system as provided by the motion target 3D coordinates 312. To compute the H1 rotation-translation transform, the calibrator 110 may execute an optimization algorithm, such as a least-square method algorithm, to the set of pairwise 3D data. Using the set of pairwise 3D data, the transform H1 may be derived by iteratively computing and minimizing re-projection errors across the plurality of motion targets within the field of view of the depth-perception sensor 104.

The method 900, at block B906, includes configuring one or more operations of the machine based at least on the first transform and the second transform. For example, given as inputs the rotation-translation transform H1 computed by the depth-perception intermediate transform computation function 116 and the rotation-translation transform H2 computed by the optical image intermediate transform computation function 114, the calibrator 110 may compute the rotation-translation transform H3 as a function of H2 and H1 (e.g., using H3=H2×H1). Using the rotation-translation transform H3 as a calibration parameter, the interior monitoring system 120 may map the 3D coordinates of features appearing in the depth-perception sensor data 108 to the 2D image frame coordinates of the optical image sensor data 106, and vice versa, map the 2D coordinates of features appearing in the optical image sensor data 106 to the 3D image frame coordinates of the depth-perception sensor data 108. The interior monitoring system 120 may, for example, use this calibration parameter to generate updated sensor data comprising a coherent set of sensor data from the combination of these sensors that may be cross-referenced between depth-perception sensor data and image frame sensor data, and/or use the calibration parameter to operate on one or more layers on the DNN(s) 122.

As an example, the interior monitoring system 120 may use the coherent set of sensor data from the optical image sensor data 106 and depth-perception sensor data 108 to, e.g., predict the presence and/or location of objects, persons, and/or animals within the interior space of the vehicle 1000, determine a gaze of an occupant(s), determine an attentiveness of an occupant, determine gestures of an occupant, and/or classify motion occurring within the vehicle interior space). One or more systems of vehicle 1000 may determine one or more actions to take based on the predictions, and/or other tasks or operations. The interior monitoring system 120 may be calibrated using the calibration parameter to account for the intrinsic and extrinsic calibration parameters of the optical image sensor(s) 102 and depth-perception sensor(s) 104 so that features captured by one sensor type may be correlated with features captured by the sensor type to form the coherent holistic set of sensor data, for example, for detecting and/or classifying motion occurring within the vehicle interior space.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Example Autonomous Vehicle

Figure 10A:
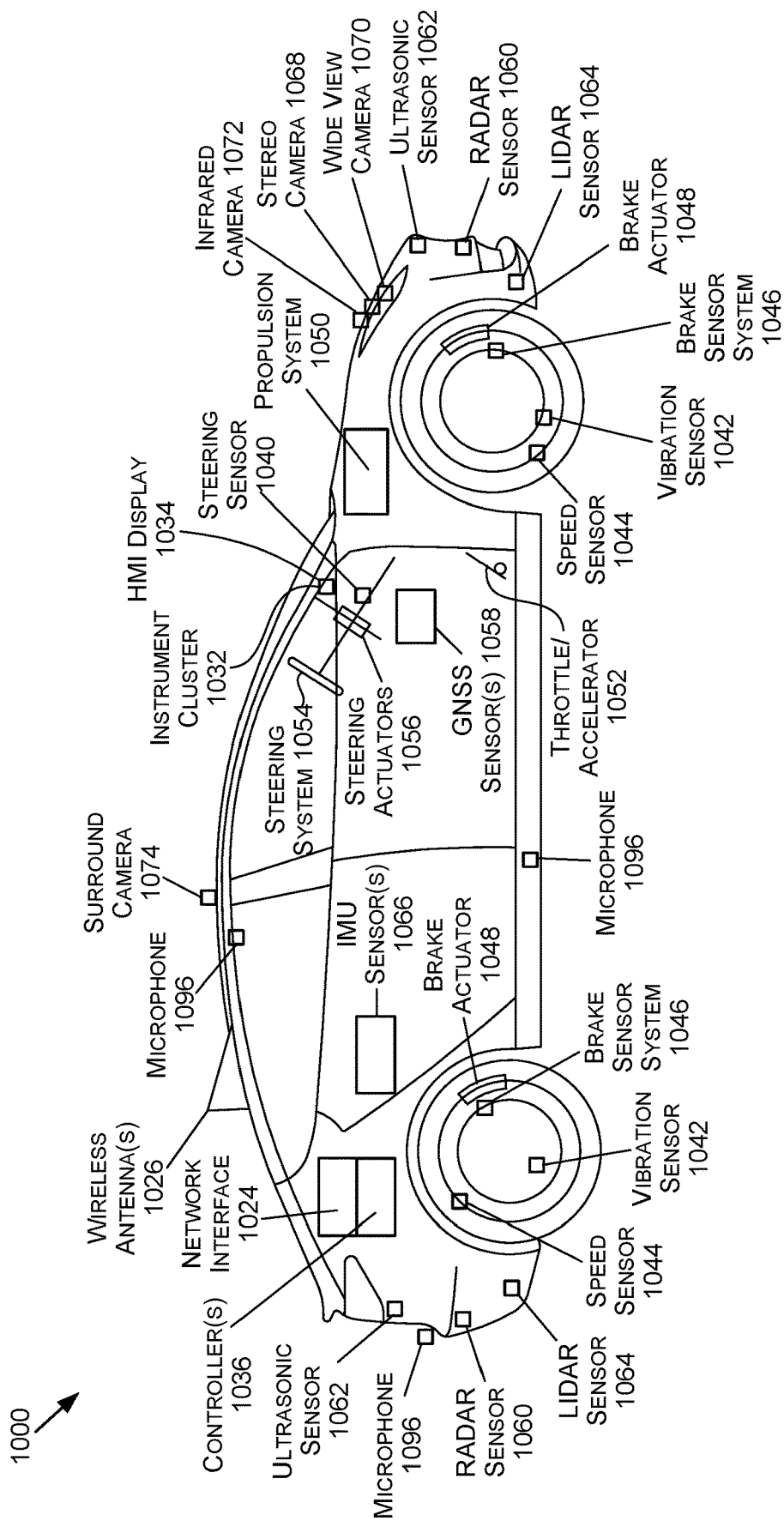
FIG. 10A is an illustration of an example autonomous vehicle, in accordance with some embodiments of the present disclosure.

FIG. 10A is an illustration of an example autonomous vehicle 1000, in accordance with some embodiments of the present disclosure. The autonomous vehicle 1000 (alternatively referred to herein as the "vehicle 1000") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1000 may be capable of functionality in accordance with one or more of Level 3-Level 5 of the autonomous driving levels. The vehicle 1000 may be capable of functionality in accordance with one or more of Level 1-Level 5 of the autonomous driving levels. For example, the vehicle 1000 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 1000 or other machine, such as being fully autonomous, being highly autonomous, being conditionally autonomous, being partially autonomous, providing assistive autonomy, being semi-autonomous, being primarily autonomous, or other designation.

The vehicle 1000 may include components such as a chassis, a vehicle body, wheels (e.g., 2, 4, 6, 8, 18, etc.), tires, axles, and other components of a vehicle. The vehicle 1000 may include a propulsion system 1050, such as an internal combustion engine, hybrid electric power plant, an all-electric engine, and/or another propulsion system type. The propulsion system 1050 may be connected to a drive train of the vehicle 1000, which may include a transmission, to enable the propulsion of the vehicle 1000. The propulsion system 1050 may be controlled in response to receiving signals from the throttle/accelerator 1052.

A steering system 1054, which may include a steering wheel, may be used to steer the vehicle 1000 (e.g., along a desired path or route) when the propulsion system 1050 is operating (e.g., when the vehicle is in motion). The steering system 1054 may receive signals from a steering actuator 1056. The steering wheel may be optional for full automation (Level 5) functionality.

The brake sensor system 1046 may be used to operate the vehicle brakes in response to receiving signals from the brake actuators 1048 and/or brake sensors.

Controller(s) 1036, which may include one or more system on chips (SoCs) 1004 (FIG. 10C) and/or GPU(s) 1008, may provide signals (e.g., representative of commands) to one or more components and/or systems of the vehicle 1000. In some embodiments, one or more operations executed by the controller(s) 1036 may be performed in response to the output(s) 124 generated by the interior monitoring system 120.

For example, the controller(s) may send signals to operate the vehicle brakes via one or more brake actuators 1048, to operate the steering system 1054 via one or more steering actuators 1056, to operate the propulsion system 1050 via one or more throttle/accelerators 1052. The controller(s) 1036 may include one or more onboard (e.g., integrated) computing devices (e.g., supercomputers) that process sensor signals, and output operation commands (e.g., signals representing commands) to enable autonomous driving and/or to assist a human driver in driving the vehicle 1000. The controller(s) 1036 may include a first controller 1036 for autonomous driving functions, a second controller 1036 for functional safety functions, a third controller 1036 for artificial intelligence functionality (e.g., computer vision), a fourth controller 1036 for infotainment functionality, a fifth controller 1036 for redundancy in emergency conditions, and/or other controllers. In some examples, a single controller 1036 may handle two or more of the above functionalities, two or more controllers 1036 may handle a single functionality, and/or any combination thereof.

The controller(s) 1036 may provide the signals for controlling one or more components and/or systems of the vehicle 1000 in response to sensor data received from one or more sensors (e.g., sensor inputs). The sensor data may be received from, for example and without limitation, global navigation satellite systems ("GNSS") sensor(s) 1058 (e.g., Global Positioning System sensor(s)), RADAR sensor(s) 1060, ultrasonic sensor(s) 1062, LIDAR sensor(s) 1064, inertial measurement unit (IMU) sensor(s) 1066 (e.g., accelerometer(s), gyroscope(s), magnetic compass(es), magnetometer(s), etc.), microphone(s) 1096, stereo camera(s) 1068, wide-view camera(s) 1070 (e.g., fisheye cameras), infrared camera(s) 1072, surround camera(s) 1074 (e.g., 360 degree cameras), long-range and/or mid-range camera(s) 1098, speed sensor(s) 1044 (e.g., for measuring the speed of the vehicle 1000), vibration sensor(s) 1042, steering sensor(s) 1040, brake sensor(s) (e.g., as part of the brake sensor system 1046), and/or other sensor types.

One or more of the controller(s) 1036 may receive inputs (e.g., represented by input data) from an instrument cluster 1032 of the vehicle 1000 and provide outputs (e.g., represented by output data, display data, etc.) via a human-machine interface (HMI) display 1034, an audible annunciator, a loudspeaker, and/or via other components of the vehicle 1000. The outputs may include information such as vehicle velocity, speed, time, map data (e.g., the High Definition ("HD") map 1022 of FIG. 0C), location data (e.g., the vehicle's 1000 location, such as on a map), direction, location of other vehicles (e.g., an occupancy grid), information about objects and status of objects as perceived by the controller(s) 1036, etc. For example, the HMI display 1034 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1000 further includes a network interface 1024 which may use one or more wireless antenna(s) 1026 and/or modem(s) to communicate over one or more networks. For example, the network interface 1024 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 1026 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 10B:
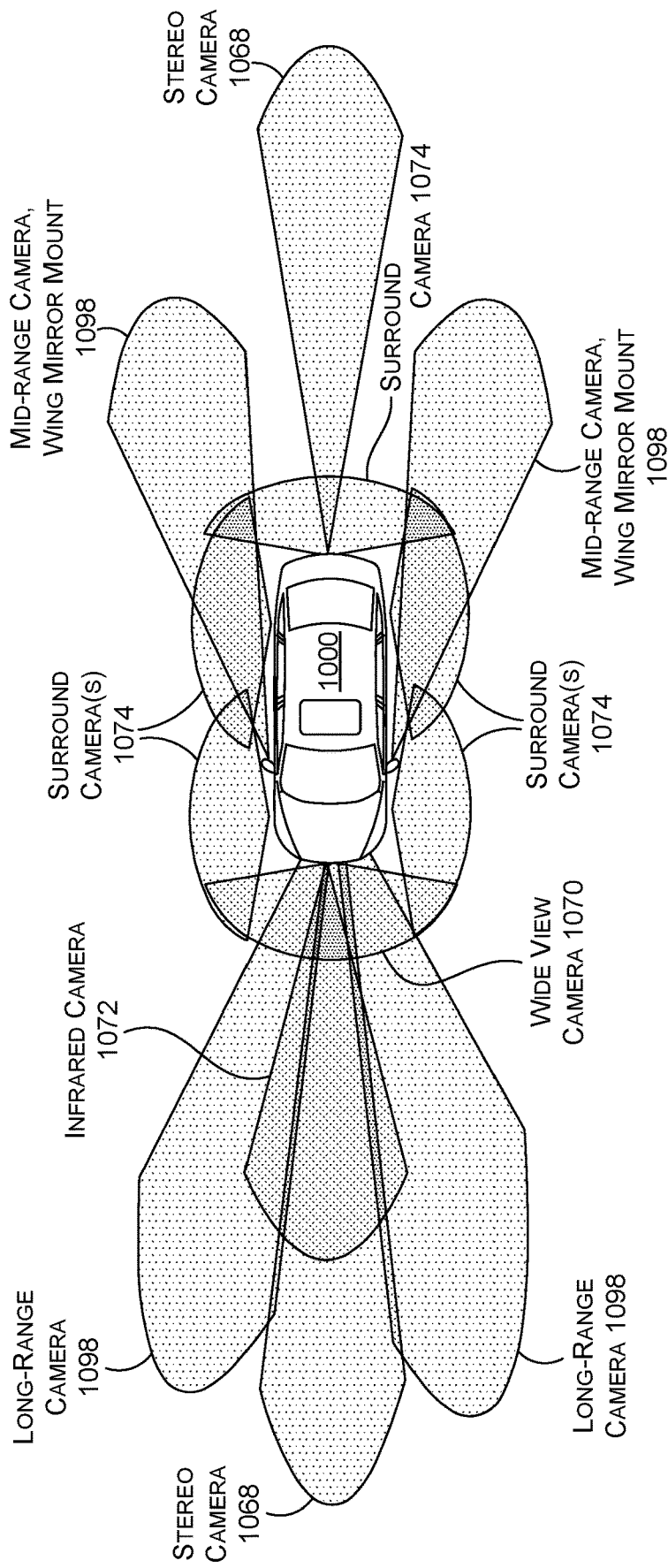
FIG. 10B is an example of camera locations and fields of view for the example autonomous vehicle of FIG. 10A, in accordance with some embodiments of the present disclosure.

FIG. 10B is an example of camera locations and fields of view for the example autonomous vehicle 1000 of FIG. 10A, in accordance with some embodiments of the present disclosure. The cameras and respective fields of view are one example embodiment and are not intended to be limiting. For example, additional and/or alternative cameras may be included and/or the cameras may be located at different locations on the vehicle 1000.

The camera types for the cameras may include, but are not limited to, digital cameras that may be adapted for use with the components and/or systems of the vehicle 1000. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1000 (e.g., front-facing cameras) may be used for surround view, to help identify forward facing paths and obstacles, as well aid in, with the help of one or more controllers 1036 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 1070 that may be used to perceive objects coming into view from the periphery (e.g., pedestrians, crossing traffic or bicycles). Although only one wide-view camera is illustrated in FIG. 10B, there may be any number (including zero) of wide-view cameras 1070 on the vehicle 1000. In addition, any number of long-range camera(s) 1098 (e.g., a long-view stereo camera pair) may be used for depth-based object detection, especially for objects for which a neural network has not yet been trained. The long-range camera(s) 1098 may also be used for object detection and classification, as well as basic object tracking.

Any number of stereo cameras 1068 may also be included in a front-facing configuration. In at least one embodiment, one or more of stereo camera(s) 1068 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 1068 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1068 may be used in addition to, or alternatively from, those described herein.

Cameras with a field of view that include portions of the environment to the side of the vehicle 1000 (e.g., side-view cameras) may be used for surround view, providing information used to create and update the occupancy grid, as well as to generate side impact collision warnings. For example, surround camera(s) 1074 (e.g., four surround cameras 1074 as illustrated in FIG. 10B) may be positioned to on the vehicle 1000. The surround camera(s) 1074 may include wide-view camera(s) 1070, fisheye camera(s), 360 degree camera(s), and/or the like. Four example, four fisheye cameras may be positioned on the vehicle's front, rear, and sides. In an alternative arrangement, the vehicle may use three surround camera(s) 1074 (e.g., left, right, and rear), and may leverage one or more other camera(s) (e.g., a forward-facing camera) as a fourth surround view camera.

Cameras with a field of view that include portions of the environment to the rear of the vehicle 1000 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1098, stereo camera(s) 1068), infrared camera(s) 1072, etc.), as described herein.

Figure 10C:
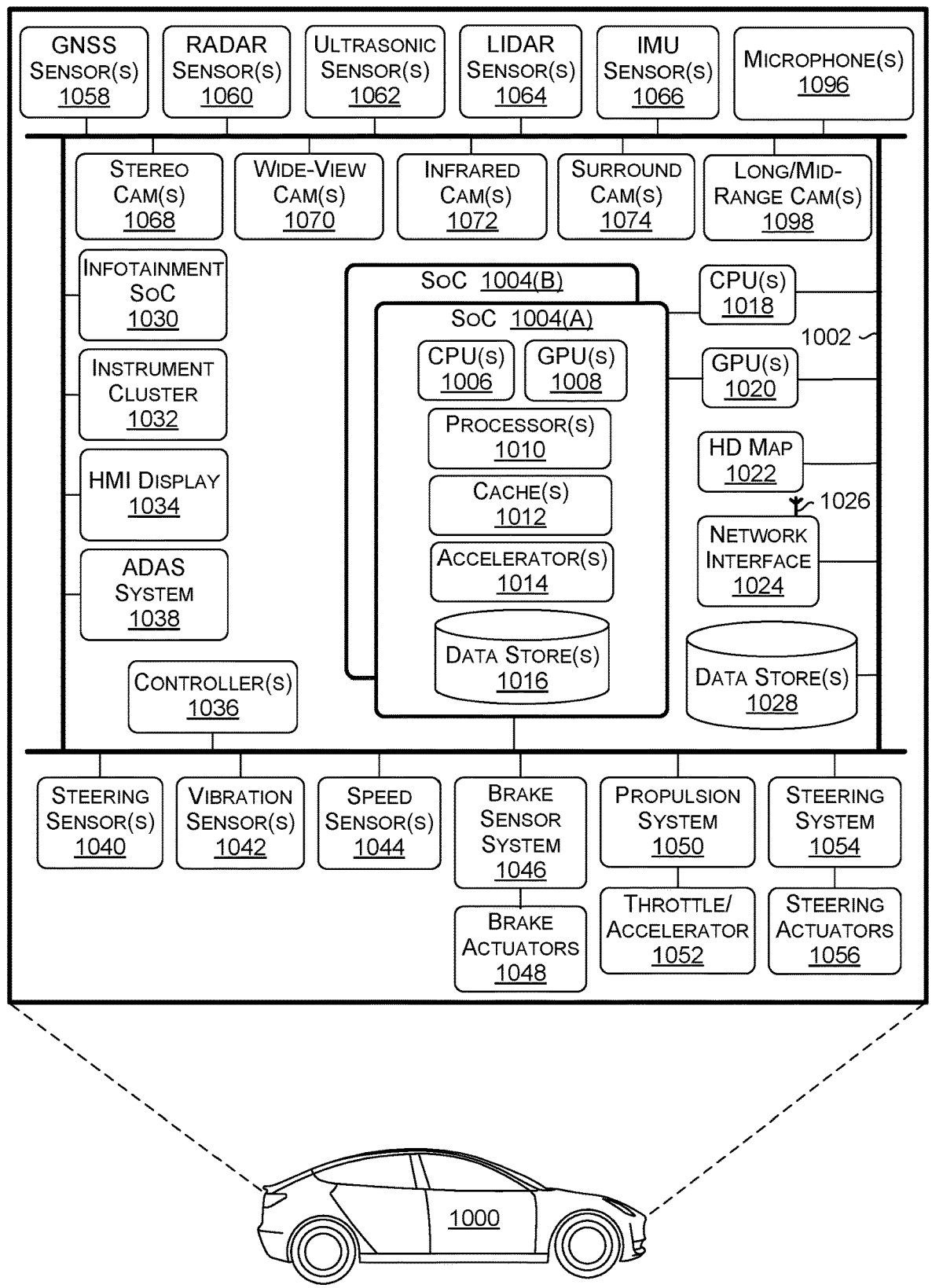
FIG. 10C is a block diagram of an example system architecture for the example autonomous vehicle of FIG. 10A, in accordance with some embodiments of the present disclosure.

FIG. 10C is a block diagram of an example system architecture for the example autonomous vehicle 1000 of FIG. 10A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1000 in FIG. 10C are illustrated as being connected via bus 1002. The bus 1002 may include a Controller Area Network (CAN) data interface (alternatively referred to herein as a "CAN bus"). A CAN may be a network inside the vehicle 1000 used to aid in control of various features and functionality of the vehicle 1000, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1002 is described herein as being a CAN bus, this is not intended to be limiting. For example, in addition to, or alternatively from, the CAN bus, FlexRay and/or Ethernet may be used. Additionally, although a single line is used to represent the bus 1002, this is not intended to be limiting. For example, there may be any number of busses 1002, which may include one or more CAN busses, one or more FlexRay busses, one or more Ethernet busses, and/or one or more other types of busses using a different protocol. In some examples, two or more busses 1002 may be used to perform different functions, and/or may be used for redundancy. For example, a first bus 1002 may be used for collision avoidance functionality and a second bus 1002 may be used for actuation control. In any example, each bus 1002 may communicate with any of the components of the vehicle 1000, and two or more busses 1002 may communicate with the same components. In some examples, each SoC 1004, each controller 1036, and/or each computer within the vehicle may have access to the same input data (e.g., inputs from sensors of the vehicle 1000), and may be connected to a common bus, such the CAN bus.

The vehicle 1000 may include one or more controller(s) 1036, such as those described herein with respect to FIG. 10A. The controller(s) 1036 may be used for a variety of functions. The controller(s) 1036 may be coupled to any of the various other components and systems of the vehicle 1000, and may be used for control of the vehicle 1000, artificial intelligence of the vehicle 1000, infotainment for the vehicle 1000, and/or the like.

The vehicle 1000 may include a system(s) on a chip (SoC) 1004. The SoC 1004 may include CPU(s) 1006, GPU(s) 1008, processor(s) 1010, cache(s) 1012, accelerator(s) 1014, data store(s) 1016, and/or other components and features not illustrated. The SoC(s) 1004 may be used to control the vehicle 1000 in a variety of platforms and systems. For example, the SoC(s) 1004 may be combined in a system (e.g., the system of the vehicle 1000) with an HD map 1022 which may obtain map refreshes and/or updates via a network interface 1024 from one or more servers (e.g., server(s) 1078 of FIG. 10D). In some embodiments, the various functions described herein with respect to the calibrator 110 and/or interior monitoring system 120 may be executed at least in part using one or more of the controller(s) 1036, SoCs 1004, CPU(s) 1006, GPU(s) 1008, and/or processor(s) 1010.

The CPU(s) 1006 may include a CPU cluster or CPU complex (alternatively referred to herein as a "CCPLEX"). The CPU(s) 1006 may include multiple cores and/or L2 caches. For example, in some embodiments, the CPU(s) 1006 may include eight cores in a coherent multi-processor configuration. In some embodiments, the CPU(s) 1006 may include four dual-core clusters where each cluster has a dedicated L2 cache (e.g., a 2 MB L2 cache). The CPU(s) 1006 (e.g., the CCPLEX) may be configured to support simultaneous cluster operation enabling any combination of the clusters of the CPU(s) 1006 to be active at any given time.

The CPU(s) 1006 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1006 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1008 may include an integrated GPU (alternatively referred to herein as an "iGPU"). The GPU(s) 1008 may be programmable and may be efficient for parallel workloads. The GPU(s) 1008, in some examples, may use an enhanced tensor instruction set. The GPU(s) 1008 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1008 may include at least eight streaming microprocessors. The GPU(s) 1008 may use compute application programming interface(s) (API(s)). In addition, the GPU(s) 1008 may use one or more parallel computing platforms and/or programming models (e.g., NVIDIA's CUDA).

The GPU(s) 1008 may be power-optimized for best performance in automotive and embedded use cases. For example, the GPU(s) 1008 may be fabricated on a Fin field-effect transistor (FinFET). However, this is not intended to be limiting and the GPU(s) 1008 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1008 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1008 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1008 to access the CPU(s) 1006 page tables directly. In such examples, when the GPU(s) 1008 memory management unit (MMU) experiences a miss, an address translation request may be transmitted to the CPU(s) 1006. In response, the CPU(s) 1006 may look in its page tables for the virtual-to-physical mapping for the address and transmits the translation back to the GPU(s) 1008. As such, unified memory technology may allow a single unified virtual address space for memory of both the CPU(s) 1006 and the GPU(s) 1008, thereby simplifying the GPU(s) 1008 programming and porting of applications to the GPU(s) 1008.

In addition, the GPU(s) 1008 may include an access counter that may keep track of the frequency of access of the GPU(s) 1008 to memory of other processors. The access counter may help ensure that memory pages are moved to the physical memory of the processor that is accessing the pages most frequently.

The SoC(s) 1004 may include any number of cache(s) 1012, including those described herein. For example, the cache(s) 1012 may include an L3 cache that is available to both the CPU(s) 1006 and the GPU(s) 1008 (e.g., that is connected both the CPU(s) 1006 and the GPU(s) 1008). The cache(s) 1012 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1004 may include an arithmetic logic unit(s) (ALU(s)) which may be leveraged in performing processing with respect to any of the variety of tasks or operations of the vehicle 1000—such as processing DNNs. In addition, the SoC(s) 1004 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 1006 and/or GPU(s) 1008.

The SoC(s) 1004 may include one or more accelerators 1014 (e.g., hardware accelerators, software accelerators, or a combination thereof). For example, the SoC(s) 1004 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1008 and to off-load some of the tasks of the GPU(s) 1008 (e.g., to free up more cycles of the GPU(s) 1008 for performing other tasks). As an example, the accelerator(s) 1014 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1014 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1008, and by using an inference accelerator, for example, a designer may target either the DLA(s) or the GPU(s) 1008 for any function. For example, the designer may focus processing of CNNs and floating point operations on the DLA(s) and leave other functions to the GPU(s) 1008 and/or other accelerator(s) 1014.

The accelerator(s) 1014 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1006. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1014 (e.g., the hardware acceleration cluster) may include a computer vision network on-chip and SRAM, for providing a high-bandwidth, low latency SRAM for the accelerator(s) 1014. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1004 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 1014 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g., from another subsystem), inertial measurement unit (IMU) sensor 1066 output that correlates with the vehicle 1000 orientation, distance, 3D location estimates of the object obtained from the neural network and/or other sensors (e.g., LIDAR sensor(s) 1064 or RADAR sensor(s) 1060), among others.

The SoC(s) 1004 may include data store(s) 1016 (e.g., memory). The data store(s) 1016 may be on-chip memory of the SoC(s) 1004, which may store neural networks to be executed on the GPU and/or the DLA. In some examples, the data store(s) 1016 may be large enough in capacity to store multiple instances of neural networks for redundancy and safety. The data store(s) 1012 may comprise L2 or L3 cache(s) 1012. Reference to the data store(s) 1016 may include reference to the memory associated with the PVA, DLA, and/or other accelerator(s) 1014, as described herein.

The SoC(s) 1004 may include one or more processor(s) 1010 (e.g., embedded processors). The processor(s) 1010 may include a boot and power management processor that may be a dedicated processor and subsystem to handle boot power and management functions and related security enforcement. The boot and power management processor may be a part of the SoC(s) 1004 boot sequence and may provide runtime power management services. The boot power and management processor may provide clock and voltage programming, assistance in system low power state transitions, management of SoC(s) 1004 thermals and temperature sensors, and/or management of the SoC(s) 1004 power states. Each temperature sensor may be implemented as a ring-oscillator whose output frequency is proportional to temperature, and the SoC(s) 1004 may use the ring-oscillators to detect temperatures of the CPU(s) 1006, GPU(s) 1008, and/or accelerator(s) 1014. If temperatures are determined to exceed a threshold, the boot and power management processor may enter a temperature fault routine and put the SoC(s) 1004 into a lower power state and/or put the vehicle 1000 into a chauffeur to safe stop mode (e.g., bring the vehicle 1000 to a safe stop).

The processor(s) 1010 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1010 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1010 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1010 may further include a real-time camera engine that may include a dedicated processor subsystem for handling real-time camera management.

The processor(s) 1010 may further include a high-dynamic range signal processor that may include an image signal processor that is a hardware engine that is part of the camera processing pipeline.

The processor(s) 1010 may include a video image compositor that may be a processing block (e.g., implemented on a microprocessor) that implements video post-processing functions needed by a video playback application to produce the final image for the player window. The video image compositor may perform lens distortion correction on wide-view camera(s) 1070, surround camera(s) 1074, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1008 is not required to continuously render new surfaces. Even when the GPU(s) 1008 is powered on and active doing 3D rendering, the video image compositor may be used to offload the GPU(s) 1008 to improve performance and responsiveness.

The SoC(s) 1004 may further include a mobile industry processor interface (MIPI) camera serial interface for receiving video and input from cameras, a high-speed interface, and/or a video input block that may be used for camera and related pixel input functions. The SoC(s) 1004 may further include an input/output controller(s) that may be controlled by software and may be used for receiving I/O signals that are uncommitted to a specific role.

The SoC(s) 1004 may further include a broad range of peripheral interfaces to enable communication with peripherals, audio codecs, power management, and/or other devices. The SoC(s) 1004 may be used to process data from cameras (e.g., connected over Gigabit Multimedia Serial Link and Ethernet), sensors (e.g., LIDAR sensor(s) 1064, RADAR sensor(s) 1060, etc. that may be connected over Ethernet), data from bus 1002 (e.g., speed of vehicle 1000, steering wheel position, etc.), data from GNSS sensor(s) 1058 (e.g., connected over Ethernet or CAN bus). The SoC(s) 1004 may further include dedicated high-performance mass storage controllers that may include their own DMA engines, and that may be used to free the CPU(s) 1006 from routine data management tasks.

The SoC(s) 1004 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1004 may be faster, more reliable, and even more energy-efficient and space-efficient than conventional systems. For example, the accelerator(s) 1014, when combined with the CPU(s) 1006, the GPU(s) 1008, and the data store(s) 1016, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1020) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1008.

In some examples, a CNN for facial recognition and vehicle owner identification may use data from camera sensors to identify the presence of an authorized driver and/or owner of the vehicle 1000. The always on sensor processing engine may be used to unlock the vehicle when the owner approaches the driver door and turn on the lights, and, in security mode, to disable the vehicle when the owner leaves the vehicle. In this way, the SoC(s) 1004 provide for security against theft and/or carjacking.

In another example, a CNN for emergency vehicle detection and identification may use data from microphones 1096 to detect and identify emergency vehicle sirens. In contrast to conventional systems, that use general classifiers to detect sirens and manually extract features, the SoC(s) 1004 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1058. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1062, until the emergency vehicle(s) passes.

The vehicle may include a CPU(s) 1018 (e.g., discrete CPU(s), or dCPU(s)), that may be coupled to the SoC(s) 1004 via a high-speed interconnect (e.g., PCIe). The CPU(s) 1018 may include an X86 processor, for example. The CPU(s) 1018 may be used to perform any of a variety of functions, including arbitrating potentially inconsistent results between ADAS sensors and the SoC(s) 1004, and/or monitoring the status and health of the controller(s) 1036 and/or infotainment SoC 1030, for example.

The vehicle 1000 may include a GPU(s) 1020 (e.g., discrete GPU(s), or dGPU(s)), that may be coupled to the SoC(s) 1004 via a high-speed interconnect (e.g., NVIDIA's NVLINK). The GPU(s) 1020 may provide additional artificial intelligence functionality, such as by executing redundant and/or different neural networks, and may be used to train and/or update neural networks based on input (e.g., sensor data) from sensors of the vehicle 1000.

The vehicle 1000 may further include the network interface 1024 which may include one or more wireless antennas 1026 (e.g., one or more wireless antennas for different communication protocols, such as a cellular antenna, a Bluetooth antenna, etc.). The network interface 1024 may be used to enable wireless connectivity over the Internet with the cloud (e.g., with the server(s) 1078 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1000 information about vehicles in proximity to the vehicle 1000 (e.g., vehicles in front of, on the side of, and/or behind the vehicle 1000). This functionality may be part of a cooperative adaptive cruise control functionality of the vehicle 1000.

The network interface 1024 may include a SoC that provides modulation and demodulation functionality and enables the controller(s) 1036 to communicate over wireless networks. The network interface 1024 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1000 may further include data store(s) 1028 which may include off-chip (e.g., off the SoC(s) 1004) storage. The data store(s) 1028 may include one or more storage elements including RAM, SRAM, DRAM, VRAM, Flash, hard disks, and/or other components and/or devices that may store at least one bit of data.

The vehicle 1000 may further include GNSS sensor(s) 1058. The GNSS sensor(s) 1058 (e.g., GPS, assisted GPS sensors, differential GPS (DGPS) sensors, etc.), to assist in mapping, perception, occupancy grid generation, and/or path planning functions. Any number of GNSS sensor(s) 1058 may be used, including, for example and without limitation, a GPS using a USB connector with an Ethernet to Serial (RS-232) bridge.

The vehicle 1000 may further include RADAR sensor(s) 1060. The RADAR sensor(s) 1060 may be used by the vehicle 1000 for long-range vehicle detection, even in darkness and/or severe weather conditions. RADAR functional safety levels may be ASIL B. The RADAR sensor(s) 1060 may use the CAN and/or the bus 1002 (e.g., to transmit data generated by the RADAR sensor(s) 1060) for control and to access object tracking data, with access to Ethernet to access raw data in some examples. A wide variety of RADAR sensor types may be used. For example, and without limitation, the RADAR sensor(s) 1060 may be suitable for front, rear, and side RADAR use. In some example, Pulse Doppler RADAR sensor(s) are used.

The RADAR sensor(s) 1060 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1060 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1000 surroundings at higher speeds with minimal interference from traffic in adjacent lanes. The other two antennae may expand the field of view, making it possible to quickly detect vehicles entering or leaving the vehicle's 1000 lane.

Mid-range RADAR systems may include, as an example, a range of up to 1060 m (front) or 80 m (rear), and a field of view of up to 42 degrees (front) or 1050 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1000 may further include ultrasonic sensor(s) 1062. The ultrasonic sensor(s) 1062, which may be positioned at the front, back, and/or the sides of the vehicle 1000, may be used for park assist and/or to create and update an occupancy grid. A wide variety of ultrasonic sensor(s) 1062 may be used, and different ultrasonic sensor(s) 1062 may be used for different ranges of detection (e.g., 2.5 m, 4 m). The ultrasonic sensor(s) 1062 may operate at functional safety levels of ASIL B.

The vehicle 1000 may include LIDAR sensor(s) 1064. The LIDAR sensor(s) 1064 may be used for object and pedestrian detection, emergency braking, collision avoidance, and/or other functions. The LIDAR sensor(s) 1064 may be functional safety level ASIL B. In some examples, the vehicle 1000 may include multiple LIDAR sensors 1064 (e.g., two, four, six, etc.) that may use Ethernet (e.g., to provide data to a Gigabit Ethernet switch).

In some examples, the LIDAR sensor(s) 1064 may be capable of providing a list of objects and their distances for a 360-degree field of view. Commercially available LIDAR sensor(s) 1064 may have an advertised range of approximately 1000 m, with an accuracy of 2 cm-3 cm, and with support for a 1000 Mbps Ethernet connection, for example. In some examples, one or more non-protruding LIDAR sensors 1064 may be used. In such examples, the LIDAR sensor(s) 1064 may be implemented as a small device that may be embedded into the front, rear, sides, and/or corners of the vehicle 1000. The LIDAR sensor(s) 1064, in such examples, may provide up to a 120-degree horizontal and 35-degree vertical field-of-view, with a 200 m range even for low-reflectivity objects. Front-mounted LIDAR sensor(s) 1064 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1000. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1064 may be less susceptible to motion blur, vibration, and/or shock.

The vehicle may further include IMU sensor(s) 1066. The IMU sensor(s) 1066 may be located at a center of the rear axle of the vehicle 1000, in some examples. The IMU sensor(s) 1066 may include, for example and without limitation, an accelerometer(s), a magnetometer(s), a gyroscope(s), a magnetic compass(es), and/or other sensor types. In some examples, such as in six-axis applications, the IMU sensor(s) 1066 may include accelerometers and gyroscopes, while in nine-axis applications, the IMU sensor(s) 1066 may include accelerometers, gyroscopes, and magnetometers.

In some embodiments, the IMU sensor(s) 1066 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1066 may enable the vehicle 1000 to estimate heading without requiring input from a magnetic sensor by directly observing and correlating the changes in velocity from GPS to the IMU sensor(s) 1066. In some examples, the IMU sensor(s) 1066 and the GNSS sensor(s) 1058 may be combined in a single integrated unit.

The vehicle may include microphone(s) 1096 placed in and/or around the vehicle 1000. The microphone(s) 1096 may be used for emergency vehicle detection and identification, among other things.

The vehicle may further include any number of camera types, including stereo camera(s) 1068, wide-view camera(s) 1070, infrared camera(s) 1072, surround camera(s) 1074, long-range and/or mid-range camera(s) 1098, and/or other camera types. The cameras may be used to capture image data around an entire periphery of the vehicle 1000. The types of cameras used depends on the embodiments and requirements for the vehicle 1000, and any combination of camera types may be used to provide the necessary coverage around the vehicle 1000. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 10A and FIG. 10B.

The vehicle 1000 may further include vibration sensor(s) 1042. The vibration sensor(s) 1042 may measure vibrations of components of the vehicle, such as the axle(s). For example, changes in vibrations may indicate a change in road surfaces. In another example, when two or more vibration sensors 1042 are used, the differences between the vibrations may be used to determine friction or slippage of the road surface (e.g., when the difference in vibration is between a power-driven axle and a freely rotating axle).

The vehicle 1000 may include an ADAS system 1038. The ADAS system 1038 may include a SoC, in some examples. The ADAS system 1038 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1060, LIDAR sensor(s) 1064, and/or a camera(s). The ACC systems may include longitudinal ACC and/or lateral ACC. Longitudinal ACC monitors and controls the distance to the vehicle immediately ahead of the vehicle 1000 and automatically adjust the vehicle speed to maintain a safe distance from vehicles ahead. Lateral ACC performs distance keeping, and advises the vehicle 1000 to change lanes when necessary. Lateral ACC is related to other ADAS applications such as LCA and CWS.

CACC uses information from other vehicles that may be received via the network interface 1024 and/or the wireless antenna(s) 1026 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1000), while the I2V communication concept provides information about traffic further ahead. CACC systems may include either or both I2V and V2V information sources. Given the information of the vehicles ahead of the vehicle 1000, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1060, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1060, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1000 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1000 if the vehicle 1000 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1060, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1000 is backing up. Some RCTW systems include AEB to ensure that the vehicle brakes are applied to avoid a crash. RCTW systems may use one or more rear-facing RADAR sensor(s) 1060, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1000, the vehicle 1000 itself must, in the case of conflicting results, decide whether to heed the result from a primary computer or a secondary computer (e.g., a first controller 1036 or a second controller 1036). For example, in some embodiments, the ADAS system 1038 may be a backup and/or secondary computer for providing perception information to a backup computer rationality module. The backup computer rationality monitor may run a redundant diverse software on hardware components to detect faults in perception and dynamic driving tasks. Outputs from the ADAS system 1038 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1004.

In other examples, ADAS system 1038 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1038 may be fed into the primary computer's perception block and/or the primary computer's dynamic driving task block. For example, if the ADAS system 1038 indicates a forward crash warning due to an object immediately ahead, the perception block may use this information when identifying objects. In other examples, the secondary computer may have its own neural network which is trained and thus reduces the risk of false positives, as described herein.

The vehicle 1000 may further include the infotainment SoC 1030 (e.g., an in-vehicle infotainment system (IVI)). Although illustrated and described as a SoC, the infotainment system may not be a SoC, and may include two or more discrete components. The infotainment SoC 1030 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1000. For example, the infotainment SoC 1030 may radios, disk players, navigation systems, video players, USB and Bluetooth connectivity, carputers, in-car entertainment, Wi-Fi, steering wheel audio controls, hands free voice control, a heads-up display (HUD), an HMI display 1034, a telematics device, a control panel (e.g., for controlling and/or interacting with various components, features, and/or systems), and/or other components. The infotainment SoC 1030 may further be used to provide information (e.g., visual and/or audible) to a user(s) of the vehicle, such as information from the ADAS system 1038, autonomous driving information such as planned vehicle maneuvers, trajectories, surrounding environment information (e.g., intersection information, vehicle information, road information, etc.), and/or other information.

The infotainment SoC 1030 may include GPU functionality. The infotainment SoC 1030 may communicate over the bus 1002 (e.g., CAN bus, Ethernet, etc.) with other devices, systems, and/or components of the vehicle 1000. In some examples, the infotainment SoC 1030 may be coupled to a supervisory MCU such that the GPU of the infotainment system may perform some self-driving functions in the event that the primary controller(s) 1036 (e.g., the primary and/or backup computers of the vehicle 1000) fail. In such an example, the infotainment SoC 1030 may put the vehicle 1000 into a chauffeur to safe stop mode, as described herein.

The vehicle 1000 may further include an instrument cluster 1032 (e.g., a digital dash, an electronic instrument cluster, a digital instrument panel, etc.). The instrument cluster 1032 may include a controller and/or supercomputer (e.g., a discrete controller or supercomputer). The instrument cluster 1032 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1030 and the instrument cluster 1032. In other words, the instrument cluster 1032 may be included as part of the infotainment SoC 1030, or vice versa.

Figure 10D:
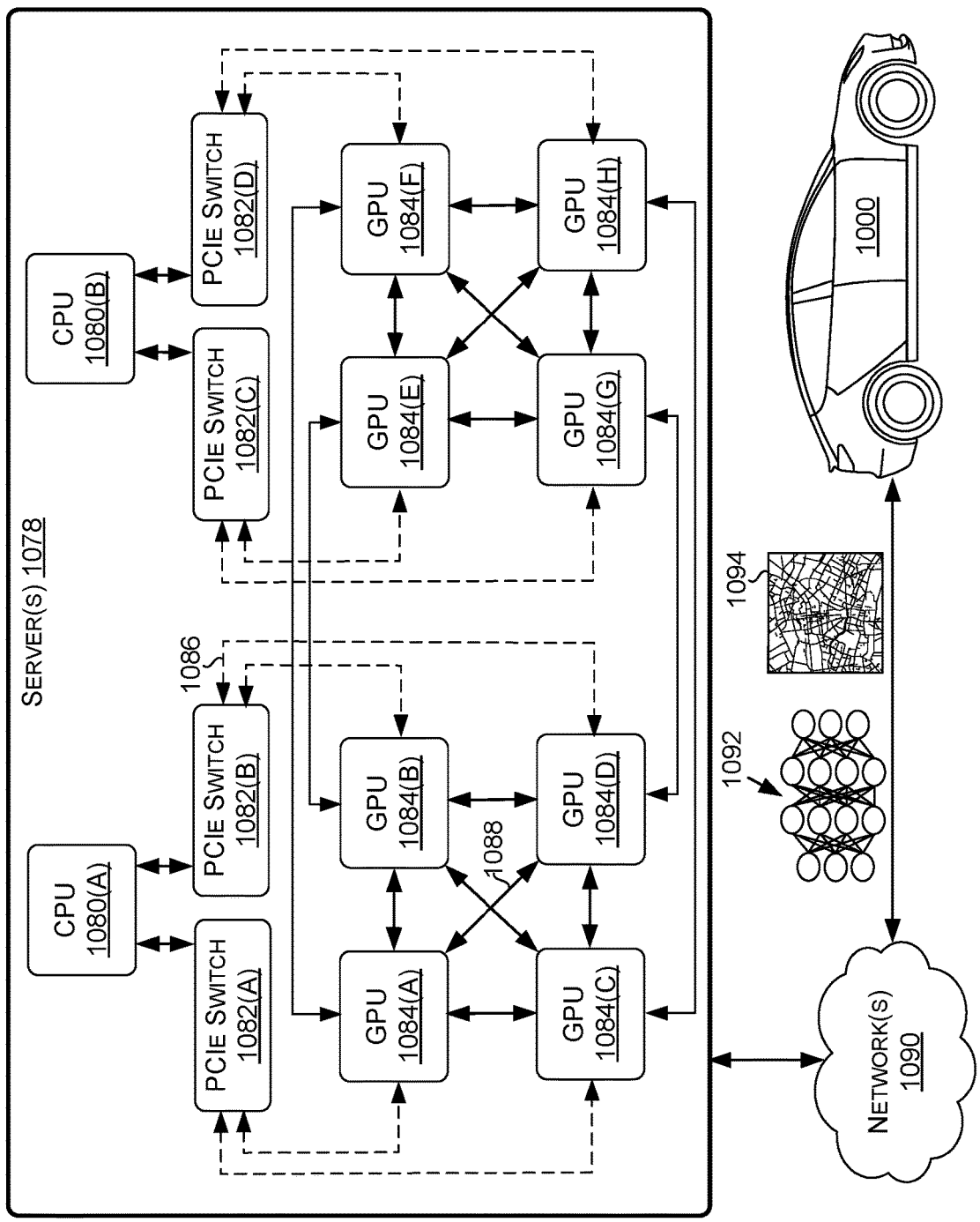
FIG. 10D is a system diagram for communication between cloud-based server(s) and the example autonomous vehicle of FIG. 10A, in accordance with some embodiments of the present disclosure.

FIG. 10D is a system diagram for communication between cloud-based server(s) and the example autonomous vehicle 1000 of FIG. 10A, in accordance with some embodiments of the present disclosure. The system 1076 may include server(s) 1078, network(s) 1090, and vehicles, including the vehicle 1000. The server(s) 1078 may include a plurality of GPUs 1084(A)-1084(H) (collectively referred to herein as GPUs 1084), PCIe switches 1082(A)-1082(H) (collectively referred to herein as PCIe switches 1082), and/or CPUs 1080(A)-1080(B) (collectively referred to herein as CPUs 1080). The GPUs 1084, the CPUs 1080, and the PCIe switches may be interconnected with high-speed interconnects such as, for example and without limitation, NVLink interfaces 1088 developed by NVIDIA and/or PCIe connections 1086. In some examples, the GPUs 1084 are connected via NVLink and/or NVSwitch SoC and the GPUs 1084 and the PCIe switches 1082 are connected via PCIe interconnects. Although eight GPUs 1084, two CPUs 1080, and two PCIe switches are illustrated, this is not intended to be limiting. Depending on the embodiment, each of the server(s) 1078 may include any number of GPUs 1084, CPUs 1080, and/or PCIe switches. For example, the server(s) 1078 may each include eight, sixteen, thirty-two, and/or more GPUs 1084.

The server(s) 1078 may receive, over the network(s) 1090 and from the vehicles, image data representative of images showing unexpected or changed road conditions, such as recently commenced road-work. The server(s) 1078 may transmit, over the network(s) 1090 and to the vehicles, neural networks 1092, updated neural networks 1092, and/or map information 1094, including information regarding traffic and road conditions. The updates to the map information 1094 may include updates for the HD map 1022, such as information regarding construction sites, potholes, detours, flooding, and/or other obstructions. In some examples, the neural networks 1092, the updated neural networks 1092, and/or the map information 1094 may have resulted from new training and/or experiences represented in data received from any number of vehicles in the environment, and/or based on training performed at a datacenter (e.g., using the server(s) 1078 and/or other servers).

The server(s) 1078 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1090, and/or the machine learning models may be used by the server(s) 1078 to remotely monitor the vehicles.

In some examples, the server(s) 1078 may receive data from the vehicles and apply the data to up-to-date real-time neural networks for real-time intelligent inferencing. The server(s) 1078 may include deep-learning supercomputers and/or dedicated AI computers powered by GPU(s) 1084, such as a DGX and DGX Station machines developed by NVIDIA. However, in some examples, the server(s) 1078 may include deep learning infrastructure that use only CPU-powered datacenters.

The deep-learning infrastructure of the server(s) 1078 may be capable of fast, real-time inferencing, and may use that capability to evaluate and verify the health of the processors, software, and/or associated hardware in the vehicle 1000. For example, the deep-learning infrastructure may receive periodic updates from the vehicle 1000, such as a sequence of images and/or objects that the vehicle 1000 has located in that sequence of images (e.g., via computer vision and/or other machine learning object classification techniques). The deep-learning infrastructure may run its own neural network to identify the objects and compare them with the objects identified by the vehicle 1000 and, if the results do not match and the infrastructure concludes that the AI in the vehicle 1000 is malfunctioning, the server(s) 1078 may transmit a signal to the vehicle 1000 instructing a fail-safe computer of the vehicle 1000 to assume control, notify the passengers, and complete a safe parking maneuver.

For inferencing, the server(s) 1078 may include the GPU(s) 1084 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 11:
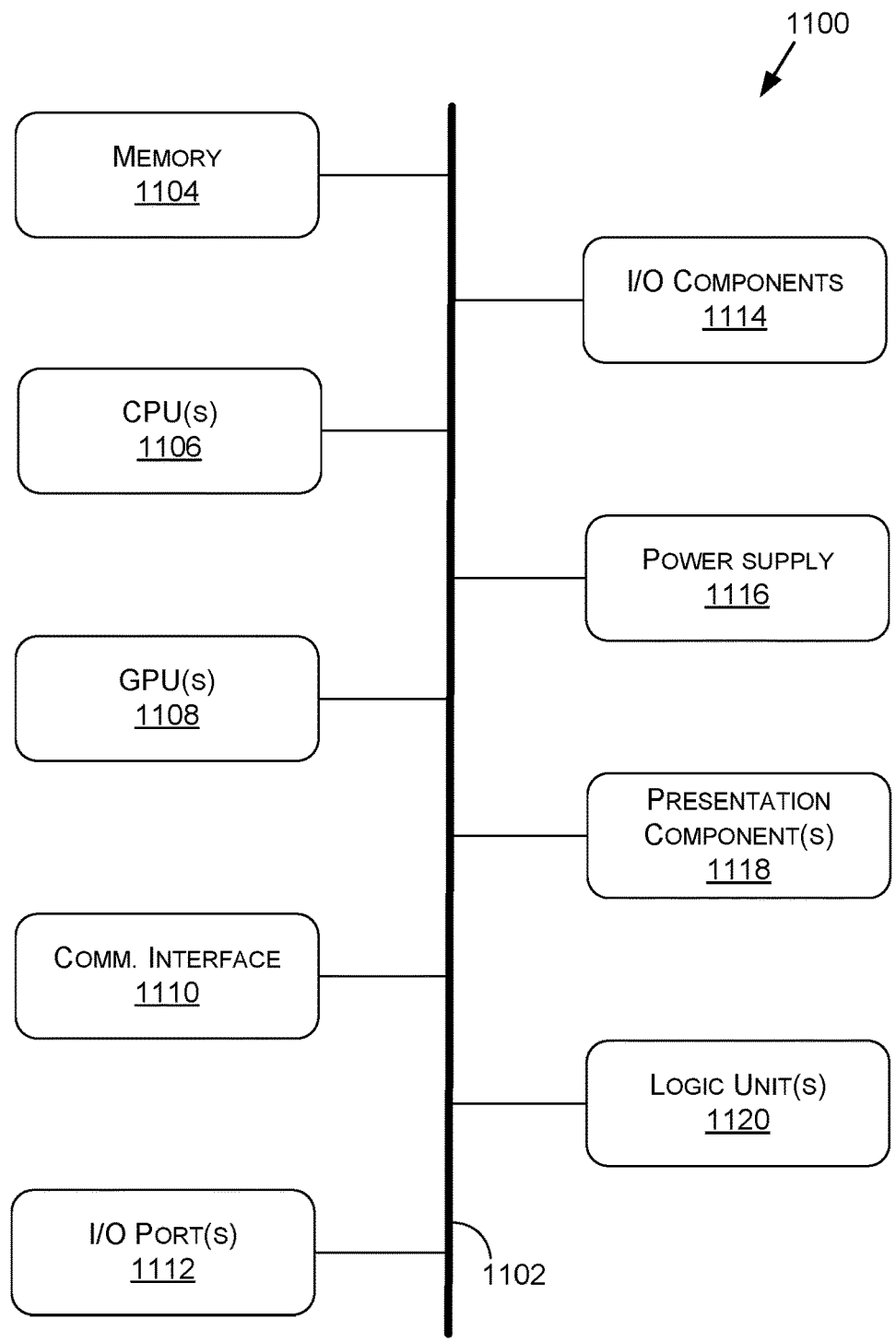
FIG. 11 is a block diagram of an example computing device suitable for use in implementing some embodiments of the present disclosure.

FIG. 11 is a block diagram of an example computing device(s) 1100 suitable for use in implementing some embodiments of the present disclosure. Computing device 1100 may include an interconnect system 1102 that directly or indirectly couples the following devices: memory 1104, one or more central processing units (CPUs) 1106, one or more graphics processing units (GPUs) 1108, a communication interface 1110, input/output (I/O) ports 1112, input/output components 1114, a power supply 1116, one or more presentation components 1118 (e.g., display(s)), and one or more logic units 1120. In at least one embodiment, the computing device(s) 1100 may comprise one or more virtual machines (VMs), and/or any of the components thereof may comprise virtual components (e.g., virtual hardware components). For non-limiting examples, one or more of the GPUs 1108 may comprise one or more vGPUs, one or more of the CPUs 1106 may comprise one or more vCPUs, and/or one or more of the logic units 1120 may comprise one or more virtual logic units. As such, a computing device(s) 1100 may include discrete components (e.g., a full GPU dedicated to the computing device 1100), virtual components (e.g., a portion of a GPU dedicated to the computing device 1100), or a combination thereof. In some embodiments, the various functions described herein with respect to the calibrator 110 and/or interior monitoring system 120 may be executed at least in part using one or more of the CPU(s) 1106 and/or GPU(s) 1108.

Although the various blocks of FIG. 11 are shown as connected via the interconnect system 1102 with lines, this is not intended to be limiting and is for clarity only. For example, in some embodiments, a presentation component 1118, such as a display device, may be considered an I/O component 1114 (e.g., if the display is a touch screen). As another example, the CPUs 1106 and/or GPUs 1108 may include memory (e.g., the memory 1104 may be representative of a storage device in addition to the memory of the GPUs 1108, the CPUs 1106, and/or other components). In other words, the computing device of FIG. 11 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 11.

The interconnect system 1102 may represent one or more links or busses, such as an address bus, a data bus, a control bus, or a combination thereof. The interconnect system 1102 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1106 may be directly connected to the memory 1104. Further, the CPU 1106 may be directly connected to the GPU 1108. Where there is direct, or point-to-point connection between components, the interconnect system 1102 may include a PCIe link to carry out the connection. In these examples, a PCI bus need not be included in the computing device 1100.

The memory 1104 may include any of a variety of computer-readable media. The computer-readable media may be any available media that may be accessed by the computing device 1100. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1104 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1100. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1106 may be configured to execute at least some of the computer-readable instructions to control one or more components of the computing device 1100 to perform one or more of the methods and/or processes described herein. The CPU(s) 1106 may each include one or more cores (e.g., one, two, four, eight, twenty-eight, seventy-two, etc.) that are capable of handling a multitude of software threads simultaneously. The CPU(s) 1106 may include any type of processor, and may include different types of processors depending on the type of computing device 1100 implemented (e.g., processors with fewer cores for mobile devices and processors with more cores for servers). For example, depending on the type of computing device 1100, the processor may be an Advanced RISC Machines (ARM) processor implemented using Reduced Instruction Set Computing (RISC) or an x86 processor implemented using Complex Instruction Set Computing (CISC). The computing device 1100 may include one or more CPUs 1106 in addition to one or more microprocessors or supplementary co-processors, such as math co-processors.

In addition to or alternatively from the CPU(s) 1106, the GPU(s) 1108 may be configured to execute at least some of the computer-readable instructions to control one or more components of the computing device 1100 to perform one or more of the methods and/or processes described herein. One or more of the GPU(s) 1108 may be an integrated GPU (e.g., with one or more of the CPU(s) 1106 and/or one or more of the GPU(s) 1108 may be a discrete GPU. In embodiments, one or more of the GPU(s) 1108 may be a coprocessor of one or more of the CPU(s) 1106. The GPU(s) 1108 may be used by the computing device 1100 to render graphics (e.g., 3D graphics) or perform general purpose computations. For example, the GPU(s) 1108 may be used for General-Purpose computing on GPUs (GPGPU). The GPU(s) 1108 may include hundreds or thousands of cores that are capable of handling hundreds or thousands of software threads simultaneously. The GPU(s) 1108 may generate pixel data for output images in response to rendering commands (e.g., rendering commands from the CPU(s) 1106 received via a host interface). The GPU(s) 1108 may include graphics memory, such as display memory, for storing pixel data or any other suitable data, such as GPGPU data. The display memory may be included as part of the memory 1104. The GPU(s) 1108 may include two or more GPUs operating in parallel (e.g., via a link). The link may directly connect the GPUs (e.g., using NVLINK) or may connect the GPUs through a switch (e.g., using NVSwitch). When combined together, each GPU 1108 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1106 and/or the GPU(s) 1108, the logic unit(s) 1120 may be configured to execute at least some of the computer-readable instructions to control one or more components of the computing device 1100 to perform one or more of the methods and/or processes described herein. In embodiments, the CPU(s) 1106, the GPU(s) 1108, and/or the logic unit(s) 1120 may discretely or jointly perform any combination of the methods, processes and/or portions thereof. One or more of the logic units 1120 may be part of and/or integrated in one or more of the CPU(s) 1106 and/or the GPU(s) 1108 and/or one or more of the logic units 1120 may be discrete components or otherwise external to the CPU(s) 1106 and/or the GPU(s) 1108. In embodiments, one or more of the logic units 1120 may be a coprocessor of one or more of the CPU(s) 1106 and/or one or more of the GPU(s) 1108.

Examples of the logic unit(s) 1120 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1110 may include one or more receivers, transmitters, and/or transceivers that enable the computing device 1100 to communicate with other computing devices via an electronic communication network, included wired and/or wireless communications. The communication interface 1110 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1120 and/or communication interface 1110 may include one or more data processing units (DPUs) to transmit data received over a network and/or through interconnect system 1102 directly to (e.g., a memory of) one or more GPU(s) 1108.

The I/O ports 1112 may enable the computing device 1100 to be logically coupled to other devices including the I/O components 1114, the presentation component(s) 1118, and/or other components, some of which may be built in to (e.g., integrated in) the computing device 1100. Illustrative I/O components 1114 include a microphone, mouse, keyboard, joystick, game pad, game controller, satellite dish, scanner, printer, wireless device, etc. The I/O components 1114 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1100. The computing device 1100 may be include depth cameras, such as stereoscopic camera systems, infrared camera systems, RGB camera systems, touchscreen technology, and combinations of these, for gesture detection and recognition. Additionally, the computing device 1100 may include accelerometers or gyroscopes (e.g., as part of an inertia measurement unit (IMU)) that enable detection of motion. In some examples, the output of the accelerometers or gyroscopes may be used by the computing device 1100 to render immersive augmented reality or virtual reality.

The power supply 1116 may include a hard-wired power supply, a battery power supply, or a combination thereof. The power supply 1116 may provide power to the computing device 1100 to enable the components of the computing device 1100 to operate.

The presentation component(s) 1118 may include a display (e.g., a monitor, a touch screen, a television screen, a heads-up-display (HUD), other display types, or a combination thereof), speakers, and/or other presentation components. The presentation component(s) 1118 may receive data from other components (e.g., the GPU(s) 1108, the CPU(s) 1106, DPUs, etc.), and output the data (e.g., as an image, video, sound, etc.).

Example Data Center

Figure 12:
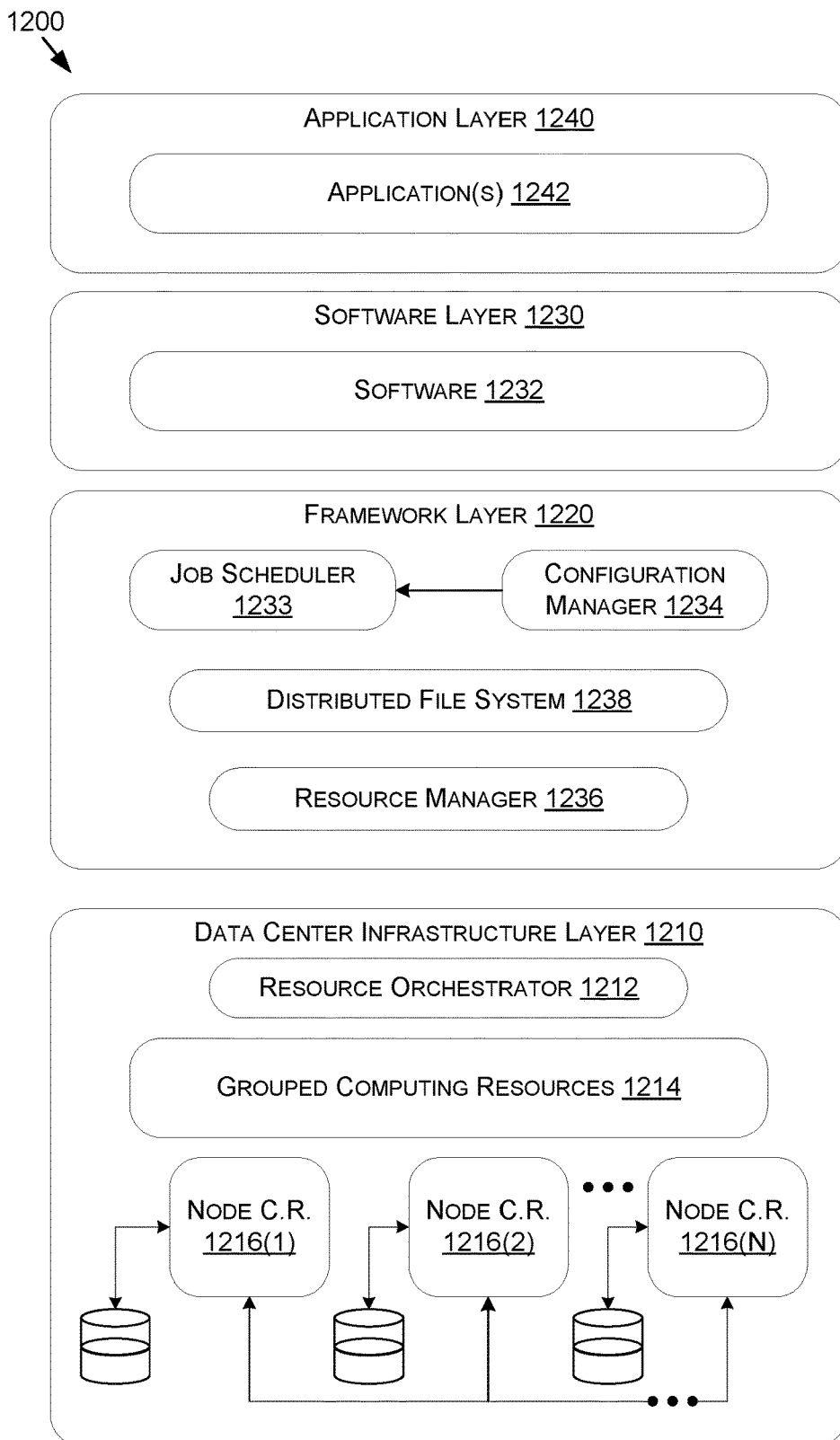
FIG. 12 is a block diagram of an example data center suitable for use in implementing some embodiments of the present disclosure.

FIG. 12 illustrates an example data center 1200 that may be used in at least one embodiments of the present disclosure. The data center 1200 may include a data center infrastructure layer 1210, a framework layer 1220, a software layer 1230, and/or an application layer 1240. In some embodiments, simulations of the various functions described herein with respect to the calibrator 110 and/or interior monitoring system 120 may be executed at least in part using the data center 1200.

As shown in FIG. 12, the data center infrastructure layer 1210 may include a resource orchestrator 1212, grouped computing resources 1214, and node computing resources ("node C.R.s") 1216(1)-1216(N), where "N" represents any whole, positive integer. In at least one embodiment, node C.R.s 1216(1)-1216(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1216(1)-1216(N) may correspond to a server having one or more of the above-mentioned computing resources. In addition, in some embodiments, the node C.R.s 1216(1)-12161(N) may include one or more virtual components, such as vGPUs, vCPUs, and/or the like, and/or one or more of the node C.R.s 1216(1)-1216(N) may correspond to a virtual machine (VM).

In at least one embodiment, grouped computing resources 1214 may include separate groupings of node C.R.s 1216 housed within one or more racks (not shown), or many racks housed in data centers at various geographical locations (also not shown). Separate groupings of node C.R.s 1216 within grouped computing resources 1214 may include grouped compute, network, memory or storage resources that may be configured or allocated to support one or more workloads. In at least one embodiment, several node C.R.s 1216 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1212 may configure or otherwise control one or more node C.R.s 1216(1)-1216(N) and/or grouped computing resources 1214. In at least one embodiment, resource orchestrator 1212 may include a software design infrastructure (SDI) management entity for the data center 1200. The resource orchestrator 1212 may include hardware, software, or some combination thereof.

In at least one embodiment, as shown in FIG. 12, framework layer 1220 may include a job scheduler 1233, a configuration manager 1234, a resource manager 1236, and/or a distributed file system 1238. The framework layer 1220 may include a framework to support software 1232 of software layer 1230 and/or one or more application(s) 1242 of application layer 1240. The software 1232 or application(s) 1242 may respectively include web-based service software or applications, such as those provided by Amazon Web Services, Google Cloud and Microsoft Azure. The framework layer 1220 may be, but is not limited to, a type of free and open-source software web application framework such as Apache Spark™ (hereinafter "Spark") that may utilize distributed file system 1238 for large-scale data processing (e.g., "big data"). In at least one embodiment, job scheduler 1233 may include a Spark driver to facilitate scheduling of workloads supported by various layers of data center 1200. The configuration manager 1234 may be capable of configuring different layers such as software layer 1230 and framework layer 1220 including Spark and distributed file system 1238 for supporting large-scale data processing. The resource manager 1236 may be capable of managing clustered or grouped computing resources mapped to or allocated for support of distributed file system 1238 and job scheduler 1233. In at least one embodiment, clustered or grouped computing resources may include grouped computing resource 1214 at data center infrastructure layer 1210. The resource manager 1236 may coordinate with resource orchestrator 1212 to manage these mapped or allocated computing resources.

In at least one embodiment, software 1232 included in software layer 1230 may include software used by at least portions of node C.R.s 1216(1)-1216(N), grouped computing resources 1214, and/or distributed file system 1238 of framework layer 1220. One or more types of software may include, but are not limited to, Internet web page search software, e-mail virus scan software, database software, and streaming video content software.

In at least one embodiment, application(s) 1242 included in application layer 1240 may include one or more types of applications used by at least portions of node C.R.s 1216(1)-1216(N), grouped computing resources 1214, and/or distributed file system 1238 of framework layer 1220. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1234, resource manager 1236, and resource orchestrator 1212 may implement any number and type of self-modifying actions based on any amount and type of data acquired in any technically feasible fashion. Self-modifying actions may relieve a data center operator of data center 1200 from making possibly bad configuration decisions and possibly avoiding underutilized and/or poor performing portions of a data center.

The data center 1200 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1200. In at least one embodiment, trained or deployed machine learning models corresponding to one or more neural networks may be used to infer or predict information using resources described above with respect to the data center 1200 by using weight parameters calculated through one or more training techniques, such as but not limited to those described herein.

In at least one embodiment, the data center 1200 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1100 of FIG. 11—e.g., each device may include similar components, features, and/or functionality of the computing device(s) 1100. In addition, where backend devices (e.g., servers, NAS, etc.) are implemented, the backend devices may be included as part of a data center 1200, an example of which is described in more detail herein with respect to FIG. 12.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1100 described herein with respect to FIG. 11. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A system comprising:
   one or more processing units to:
   determine, based at least on image data generated using an image sensor and corresponding to one or more calibration targets comprising at least one motion target and positioned within an interior space of a machine, a first transform between a three-dimensional (3D) intermediary coordinate system and a two-dimensional (2D) image coordinate system corresponding to the image sensor, wherein the 3D intermediary coordinate system is computed based at least on the one or more calibration targets;
   determine, based at least on sensor data generated using a depth sensor and corresponding to at least one calibration target of the one or more calibration targets, a second transform between the 3D intermediary coordinate system and a 3D coordinate system corresponding to the depth sensor, the second transform determined based at least on at least one 3D coordinate corresponding to the at least one motion target; and
   configure one or more operations of the machine based at least on the first transform and the second transform.

2. The system of claim 1, wherein the first transform includes a first rotation-translation transform and the second transform includes a second rotation-translation transform.

3. The system of claim 1, wherein the one or more processing units are further to:
   detect one or more fiducial point markers corresponding to the one or more calibration targets using the image data;
   determine at least one 2D image coordinate in the 2D image coordinate system corresponding to the one or more fiducial point markers; and
   determine the first transform based at least on the at least one 2D image coordinate and at least one 3D coordinate in the 3D intermediary coordinate system corresponding to the one or more fiducial point markers.

4. The system of claim 3, wherein the one or more processing units are further to:
   compute the first transform using a set of one or more coordinate pairs that include the at least one 2D image coordinate and the at least one 3D coordinate for at least a first fiducial point corresponding to the one or more fiducial point markers, and a second at least one 2D image coordinate and a second at least one 3D coordinate for at least a second fiducial point corresponding to the one or more fiducial point markers.

5. The system of claim 1, wherein the one or more processing units are further to:
   detect one or more fiducial point markers of the one or more calibration targets using the image data by using at least on at least one of: a computer vision algorithm, a neural network, or a machine learning algorithm.

6. The system of claim 1, wherein the one or more processing units are further to:
   detect one or more fiducial point markers of the one or more calibration targets using the image data;
   determine at least one 2D image coordinate in the 2D image coordinate system corresponding to the one or more fiducial point markers;
   determine at least one 3D coordinate in the 3D intermediary coordinate system based at least on one or more pre-determined coordinates corresponding to the one or more fiducial point markers derived using a 3D reconstruction of the one or more calibration targets; and
   determine the first transform based at least on the at least one 2D image coordinate and the at least one 3D coordinate in the 3D intermediary coordinate system.

7. The system of claim 1, wherein the one or more processing units are further to:
   determine a third transform between a second 2D image coordinate system of a second image sensor and the 3D intermediary coordinate system based at least on second image data generated using the second image sensor, the second image data corresponding to the one or more calibration targets; and
   configure the one or more operations based at least on the first transform, the second transform, and the third transform.

8. The system of claim 1, wherein the one or more processing units are further to:
   detect one or more motion targets corresponding to the one or more calibration targets using the sensor data;
   determine at least one 3D coordinate corresponding to the one or more motion targets in the 3D coordinate system of the depth sensor, the at least one 3D coordinate corresponding to the one or more motion targets; and
   determine the second transform based at least on the at least one 3D coordinate in the 3D coordinate system and at least one 3D coordinate in the 3D intermediary coordinate system corresponding to the one or more motion targets.

9. The system of claim 8, wherein the one or more processing units are further to detect the one or more motion targets based at least on a spinning motion of the one or more motion targets.

10. The system of claim 1, wherein the one or more processing units are further to:
    generate the 3D intermediary coordinate system based at least on a 3D reconstruction computed using one or more images of the one or more calibration targets.

11. The system of claim 1, wherein the one or more processing units are further to:
    determine, based at least on a third transform computed using the first transform and the second transform, a position within the 2D image coordinate system of the image sensor of at least one feature detected using the sensor data.

12. The system of claim 1, wherein at least one calibration target of the one or more calibration targets comprises:
- a structural substrate;
- one or more fiducial point markers integrated with the structural substrate; and
- one or more motion targets comprising a moving component that rotates with respect to the structural substrate.

13. The system of claim 1, wherein the system is comprised in at least one of:
- a control system for an autonomous or semi-autonomous machine;
- a perception system for an autonomous or semi-autonomous machine;
- a system for performing simulation operations;
- a system for performing digital twin operations;
- a system for performing light transport simulation;
- a system for performing collaborative content creation for 3D assets;
- a system for performing deep learning operations;
- a system for performing real-time streaming;
- a system for generating or presenting one or more of augmented reality content, virtual reality content, or mixed reality content;
- a system implemented using an edge device;
- a system implemented using a robot;
- a system for performing conversational AI operations;
- a system for generating synthetic data;
- a system incorporating one or more virtual machines (VMs);
- a system implemented at least partially in a data center; or
- a system implemented at least partially using cloud computing resources.

14. A processor comprising:
one or more processing units to:
- determine, based at least on image data generated using an image sensor, a first transform between an intermediary coordinate system and a first coordinate system corresponding to the image sensor, the image data corresponding to one or more calibration targets comprising at least one motion target and positioned within an interior space of an ego-machine, wherein the intermediary coordinate system is computed based at least on the one or more calibration targets;
- determine, based at least on sensor data generated using a depth sensor, a second transform between the intermediary coordinate system and a second coordinate system corresponding to the depth sensor, the second transform determined based at least on at least one coordinate corresponding to the at least one motion target; and
- determining a third transform between the image sensor and the depth sensor based at least on the first transform and the second transform.

15. The processor of claim 14, wherein the one or more processing units are further to:
- detect one or more fiducial point markers of the one or more calibration targets based at least on the image data;
- determine a two-dimensional (2D) image coordinate in the first coordinate system corresponding to the one or more fiducial point markers; and
- determine the first transform based at least on the 2D image coordinate and a three-dimensional (3D) coordinate in the intermediary coordinate system corresponding to the one or more fiducial point markers.

16. The processor of claim 14, wherein the one or more processing units are further to:
- detect one or more fiducial point markers of the one or more calibration targets based at least on the image data using one or more of a computer vision algorithm, a neural network, or a machine learning algorithm.

17. The processor of claim 14, wherein the one or more processing units are further to:
- detect one or more motion targets of the one or more calibration targets based at least on the sensor data;
- determine a three-dimensional (3D) image coordinate in the second coordinate system corresponding to the one or more motion targets; and
- determine the second transform based at least on a 3D coordinate in the second coordinate system corresponding to the one or more motion targets and a 3D coordinate in the intermediary coordinate system corresponding to the one or more motion targets.

18. The processor of claim 14, wherein the one or more processing units are further to:
- generate the intermediary coordinate system based at least on a three-dimensional (3D) reconstruction computed using one or more images depicting the one or more calibration targets.

19. The processor of claim 14, wherein the one or more processing units are further to:
- determine, based at least on the sensor data and a third transform computed using the first transform and the second transform, a position of at least one feature detected in the first coordinate system.

20. The processor of claim 14, wherein at least one of the first transform, the second transform, or the third transform include a rotation-translation transform.

21. The processor of claim 14, wherein the processor is comprised in at least one of:
- a control system for an autonomous or semi-autonomous machine;
- a perception system for an autonomous or semi-autonomous machine;
- a system for performing simulation operations;
- a system for performing digital twin operations;
- a system for performing light transport simulation;
- a system for performing collaborative content creation for 3D assets;
- a system for performing deep learning operations;
- a system for performing real-time streaming;
- a system for generating or presenting one or more of augmented reality content, virtual reality content, or mixed reality content;
- a system implemented using an edge device;
- a system implemented using a robot;
- a system for performing conversational AI operations;
- a system for generating synthetic data;
- a system incorporating one or more virtual machines (VMs);
- a system implemented at least partially in a data center; or
- a system implemented at least partially using cloud computing resources.

22. A method comprising:
- translating one or more features of an interior space between coordinates of a two-dimensional (2D) image coordinate system corresponding to an image sensor and coordinates of a three-dimensional (3D) coordinate system corresponding to a depth sensor, the translating being performed based at least on a first transform between the 2D image coordinate system and an intermediary coordinate system and a second transform between the 3D coordinate system and the intermediary coordinate system;

wherein the intermediary coordinate system is computed based at least on one or more calibration targets positioned within the interior space, at least one of the one or more calibration targets comprising one or more motion targets, the second transform determined based at least on at least one 3D coordinate corresponding to the one or more motion targets in the 3D coordinate system of the depth sensor.

* * * * *